United States Patent
Harada

(10) Patent No.: US 10,714,124 B2
(45) Date of Patent: Jul. 14, 2020

(54) STORAGE DEVICE AND STORAGE METHOD

(71) Applicant: TOSHIBA MEMORY CORPORATION, Minato-ku (JP)

(72) Inventor: Kohsuke Harada, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/553,750

(22) Filed: Aug. 28, 2019

(65) Prior Publication Data
US 2020/0135231 A1    Apr. 30, 2020

(30) Foreign Application Priority Data
Oct. 29, 2018  (JP) .................. 2018-202515

(51) Int. Cl.
G11B 5/09 (2006.01)
G11B 20/12 (2006.01)

(52) U.S. Cl.
CPC ............ *G11B 5/09* (2013.01); *G11B 20/1217* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 7,006,019 B2 | 2/2006 | Lee et al. | |
| 8,384,567 B2 | 2/2013 | Higashino | |
| 9,305,638 B1 * | 4/2016 | Chang | G11C 11/5628 |
| 2003/0126397 A1 * | 7/2003 | Junge | G06F 9/342 |
| | | | 711/200 |
| 2010/0125772 A1 * | 5/2010 | Cheng | G06F 11/1068 |
| | | | 714/758 |

(Continued)

FOREIGN PATENT DOCUMENTS

| | | |
|---|---|---|
| JP | 2001-144621 A | 5/2001 |
| JP | 2005-135575 A | 5/2005 |

(Continued)

OTHER PUBLICATIONS

Yoshino, S. et al., "Performance Comparisons of Multi-level Codes for High Density MO Recording," Proc. IEEE Int. Conf. Commun. (ICC)., vol. 3, Jun. 1996, pp. 1538-1541.

(Continued)

*Primary Examiner* — Peter Vincent Agustin
(74) *Attorney, Agent, or Firm* — Oblon, McClelland, Maier & Neustadt, L.L.P.

(57) ABSTRACT

According to one embodiment, in a storage device, a selection circuit selects one mapping rule from a plurality of mapping rules in which each of bit labels having a bit length of (n+1) or more is mapped to n M-ary symbols, when M is defined as an integer of 3 or more and n is defined as an integer of or more. A first conversion circuit converts a data block in data into an M-ary symbol sequence using the selected one mapping rule. A second conversion circuit converts the converted M-ary symbol sequence into an M-step pulse width signal. The recording medium records the converted M-step pulse width signal. A readback circuit equalizes the signal read from the recording medium to the M-ary symbol sequence and restores the data.

20 Claims, 12 Drawing Sheets

MAPPING RULE Ra

| BIT LABEL | SYMBOL SEQUENCE | START PATTERN | TERMINATION PATTERN |
|---|---|---|---|
| 00000 | (-1, -1, -1, -1) | Pa | Sa |
| 00001 | (-1, -1, -1, 0) | Pa | Sb |
| 00010 | (-1, -1, -1, 1) | Pa | Sb |
| 00011 | (-1, -1, 0, 0) | Pa | Sa |
| 00100 | (-1, -1, 0, 1) | Pa | Sb |
| 00101 | (-1, -1, 1, -1) | Pa | Sa |
| 00110 | (-1, -1, 1, 0) | Pa | Sa |
| 00111 | (-1, -1, 1, 1) | Pa | Sb |
| 01000 | (-1, 0, 0, -1) | Pa | Sa |
| 01001 | (-1, 0, 0, 0) | Pa | Sb |
| 01010 | (-1, 0, 1, -1) | Pa | Sa |
| 01011 | (-1, 0, 1, 0) | Pa | Sa |
| 01100 | (-1, 0, 1, 1) | Pa | Sb |
| 01101 | (-1, 1, -1, -1) | Pa | Sa |
| 01110 | (-1, 1, -1, 0) | Pa | Sb |
| 01111 | (-1, 1, -1, 1) | Pa | Sb |
| 10000 | (-1, 1, 0, -1) | Pa | Sa |
| 10001 | (-1, 1, 0, 0) | Pa | Sb |
| 10010 | (-1, 1, 1, -1) | Pa | Sa |
| 10011 | (-1, 1, 1, 0) | Pa | Sa |
| 10100 | (-1, 1, 1, 1) | Pa | Sb |
| 10101 | (0, 0, -1, -1) | Pa | Sa |
| 10110 | (0, 0, -1, 0) | Pa | Sb |
| 10111 | (0, 0, -1, 1) | Pa | Sb |
| 11000 | (0, 1, -1, -1) | Pa | Sa |
| 11001 | (0, 1, -1, 0) | Pa | Sb |
| 11010 | (0, 1, -1, 1) | Pa | Sb |
| 11011 | (0, 1, 0, -1) | Pa | Sa |
| 11100 | (0, 1, 0, 0) | Pa | Sb |
| 11101 | (0, 1, 1, -1) | Pa | Sa |
| 11110 | (0, 1, 1, 0) | Pa | Sa |
| 11111 | (0, 1, 1, 1) | Pa | Sb |

(56) References Cited

U.S. PATENT DOCUMENTS

| 2012/0110418 A1* | 5/2012 | Ma | H03M 13/1157 |
| | | | 714/773 |
| 2012/0140560 A1* | 6/2012 | Yang | G06F 3/064 |
| | | | 365/185.18 |
| 2018/0197573 A1 | 7/2018 | Harada et al. | |

FOREIGN PATENT DOCUMENTS

| JP | 2011-254445 A | 12/2011 |
| JP | 2018-113088 A | 7/2018 |

OTHER PUBLICATIONS

Yuminaka, Y. et al., "A Ternary Partial-Response Signaling Scheme for Capacitively Coupled Interface," 2010 $40^{th}$ IEEE International Symposium on Multiple-Valued Logic, 2010, pp. 331-336.

* cited by examiner

FIG.2A

| ONE TERNARY SYMBOL | QUADRUPLE UP-SAMPLED SEQUENCE |
|---|---|
| -1 | 0000 |
| 0 | 0011 |
| 1 | 1111 |

FIG.2B

TERMINATION PATTERN Sa

| k TERNARY SYMBOLS (k IS INTEGER OF 4 OR LESS) | QUADRUPLE UP-SAMPLED SEQUENCE | OPTIMIZED BIT SEQUENCE |
|---|---|---|
| (⋯, 1) | (⋯, 1111) | (⋯, 1111) |
| (⋯, -1, 0) | (⋯, 0000, 1111) | (⋯, 0000, 1111) |
| (⋯, -1, 0, 0) | (⋯, 1111, 0011, 0011) | (⋯, 1111, 1100, 0011) |
| (-1, 0, 0, 0) | (0000, 0011, 0011, 0011) | (0000, 0011, 1100, 0011) |

FIG.2C

TERMINATION PATTERN Sb

| k TERNARY SYMBOLS (k IS INTEGER OF 4 OR LESS) | QUADRUPLE UP-SAMPLED SEQUENCE | OPTIMIZED BIT SEQUENCE |
|---|---|---|
| (⋯, 1) | (⋯, 0000) | (⋯, 0000) |
| (⋯, -1, 0) | (⋯, 1111, 0011) | (⋯, 1111, 1100) |
| (⋯, -1, 0, 0) | (⋯, 0000, 0011, 0011) | (⋯, 0000, 0011, 1100) |
| (-1, 0, 0, 0) | (1111, 0011, 0011, 0011) | (1111, 1100, 0011, 1100) |

FIG.2D

START PATTERN Pa

| k TERNARY SYMBOLS (k IS INTEGER OF 4 OR LESS) | QUADRUPLE UP-SAMPLED SEQUENCE | OPTIMIZED BIT SEQUENCE |
|---|---|---|
| (1, ⋯) | (1111, ⋯) | (1111, ⋯) |
| (0, -1, ⋯) | (0011, 0000, ⋯) | (1100, 0000, ⋯) |
| (0, 0, 1, ⋯) | (0011, 0011, 1111, ⋯) | (1100, 0011, 1111, ⋯) |
| (0, 0, 0, -1) | (0011, 0011, 0011, 0000) | (1100, 0011, 1100, 0000) |

FIG.2E

START PATTERN Pb

| k TERNARY SYMBOLS (k IS INTEGER OF 4 OR LESS) | QUADRUPLE UP-SAMPLED SEQUENCE | OPTIMIZED BIT SEQUENCE |
|---|---|---|
| (-1, ⋯) | (0000, ⋯) | (0000, ⋯) |
| (0, 1, ⋯) | (0011, 1111, ⋯) | (0011, 1111, ⋯) |
| (0, 0, -1, ⋯) | (0011, 0011, 0000, ⋯) | (0011, 1100, 0000, ⋯) |
| (0, 0, 0, 1) | (0011, 0011, 0011, 1111) | (0011, 1100, 0011, 1111) |

FIG.3

MAPPING RULE Ra

| BIT LABEL | SYMBOL SEQUENCE | START PATTERN | TERMINATION PATTERN |
|---|---|---|---|
| 00000 | (-1, -1, -1, -1) | Pa | Sa |
| 00001 | (-1, -1, -1, 0) | Pa | Sb |
| 00010 | (-1, -1, -1, 1) | Pa | Sb |
| 00011 | (-1, -1, 0, 0) | Pa | Sa |
| 00100 | (-1, -1, 0, 1) | Pa | Sb |
| 00101 | (-1, -1, 1, -1) | Pa | Sa |
| 00110 | (-1, -1, 1, 0) | Pa | Sa |
| 00111 | (-1, -1, 1, 1) | Pa | Sb |
| 01000 | (-1, 0, 0, -1) | Pa | Sa |
| 01001 | (-1, 0, 0, 0) | Pa | Sb |
| 01010 | (-1, 0, 1, -1) | Pa | Sa |
| 01011 | (-1, 0, 1, 0) | Pa | Sa |
| 01100 | (-1, 0, 1, 1) | Pa | Sb |
| 01101 | (-1, 1, -1, -1) | Pa | Sa |
| 01110 | (-1, 1, -1, 0) | Pa | Sb |
| 01111 | (-1, 1, -1, 1) | Pa | Sb |
| 10000 | (-1, 1, 0, -1) | Pa | Sa |
| 10001 | (-1, 1, 0, 0) | Pa | Sb |
| 10010 | (-1, 1, 1, -1) | Pa | Sa |
| 10011 | (-1, 1, 1, 0) | Pa | Sa |
| 10100 | (-1, 1, 1, 1) | Pa | Sb |
| 10101 | (0, 0, -1, -1) | Pa | Sa |
| 10110 | (0, 0, -1, 0) | Pa | Sb |
| 10111 | (0, 0, -1, 1) | Pa | Sb |
| 11000 | (0, 1, -1, -1) | Pa | Sa |
| 11001 | (0, 1, -1, 0) | Pa | Sb |
| 11010 | (0, 1, -1, 1) | Pa | Sb |
| 11011 | (0, 1, 0, -1) | Pa | Sa |
| 11100 | (0, 1, 0, 0) | Pa | Sb |
| 11101 | (0, 1, 1, -1) | Pa | Sa |
| 11110 | (0, 1, 1, 0) | Pa | Sa |
| 11111 | (0, 1, 1, 1) | Pa | Sb |

FIG.4

MAPPING RULE Rb

| BIT LABEL | SYMBOL SEQUENCE | START PATTERN | TERMINATION PATTERN |
|---|---|---|---|
| 00000 | (0, -1, -1, -1) | Pb | Sa |
| 00001 | (0, -1, -1, 0) | Pb | Sb |
| 00010 | (0, -1, -1, 1) | Pb | Sb |
| 00011 | (0, -1, 0, 0) | Pb | Sa |
| 00100 | (0, -1, 0, 1) | Pb | Sb |
| 00101 | (0, -1, 1, -1) | Pb | Sa |
| 00110 | (0, -1, 1, 0) | Pb | Sa |
| 00111 | (0, -1, 1, 1) | Pb | Sb |
| 01000 | (0, 0, 1, -1) | Pb | Sa |
| 01001 | (0, 0, 1, 0) | Pb | Sa |
| 01010 | (0, 0, 1, 1) | Pb | Sb |
| 01011 | (1, -1, -1, -1) | Pb | Sa |
| 01100 | (1, -1, -1, 0) | Pb | Sb |
| 01101 | (1, -1, -1, 1) | Pb | Sb |
| 01110 | (1, -1, 0, 0) | Pb | Sb |
| 01111 | (1, -1, 0, 1) | Pb | Sb |
| 10000 | (1, -1, 1, -1) | Pb | Sa |
| 10001 | (1, -1, 1, 0) | Pb | Sa |
| 10010 | (1, -1, 1, 1) | Pb | Sb |
| 10011 | (1, 0, -1, -1) | Pb | Sa |
| 10100 | (1, 0, -1, 0) | Pb | Sb |
| 10101 | (1, 0, -1, 1) | Pb | Sb |
| 10110 | (1, 0, 0, 0) | Pb | Sa |
| 10111 | (1, 0, 0, 1) | Pb | Sb |
| 11000 | (1, 1, -1, -1) | Pb | Sa |
| 11001 | (1, 1, -1, 0) | Pb | Sb |
| 11010 | (1, 1, -1, 1) | Pb | Sb |
| 11011 | (1, 1, 0, -1) | Pb | Sa |
| 11100 | (1, 1, 0, 0) | Pb | Sb |
| 11101 | (1, 1, 1, -1) | Pb | Sa |
| 11110 | (1, 1, 1, 0) | Pb | Sa |
| 11111 | (1, 1, 1, 1) | Pb | Sb |

FIG.9

MAPPING RULE Ra'

| BIT LABEL | SYMBOL SEQUENCE | START PATTERN | TERMINATION PATTERN |
|---|---|---|---|
| 00000 | (-1, -1, -1, -1) | Pa | Sa |
| 00001 | (0, -1, -1, 0) | Pb | Sb |
| 00010 | (-1, -1, -1, 1) | Pa | Sb |
| 00011 | (0, -1, 0, 0) | Pb | Sa |
| 00100 | (-1, -1, 0, 1) | Pa | Sb |
| 00101 | (0, -1, 1, -1) | Pb | Sa |
| 00110 | (-1, -1, 1, 0) | Pa | Sa |
| 00111 | (0, -1, 1, 1) | Pb | Sb |
| 01000 | (-1, 0, 0, -1) | Pa | Sa |
| 01001 | (0, 0, 1, 0) | Pb | Sa |
| 01010 | (-1, 0, 1, -1) | Pa | Sa |
| 01011 | (1, -1, -1, -1) | Pb | Sa |
| 01100 | (-1, 0, 1, 1) | Pa | Sb |
| 01101 | (1, -1, -1, 1) | Pb | Sb |
| 01110 | (-1, 1, -1, 0) | Pa | Sb |
| 01111 | (1, -1, 0, 1) | Pb | Sb |
| 10000 | (-1, 1, 0, -1) | Pa | Sa |
| 10001 | (1, -1, 1, 0) | Pb | Sa |
| 10010 | (-1, 1, 1, -1) | Pa | Sa |
| 10011 | (1, 0, -1, -1) | Pb | Sa |
| 10100 | (-1, 1, 1, 1) | Pa | Sb |
| 10101 | (1, 0, -1, 1) | Pb | Sb |
| 10110 | (0, 0, -1, 0) | Pa | Sb |
| 10111 | (1, 0, 0, 1) | Pb | Sb |
| 11000 | (0, 1, -1, -1) | Pa | Sa |
| 11001 | (1, 1, -1, 0) | Pb | Sb |
| 11010 | (0, 1, -1, 1) | Pa | Sb |
| 11011 | (1, 1, 0, -1) | Pb | Sa |
| 11100 | (0, 1, 0, 0) | Pa | Sb |
| 11101 | (1, 1, 1, -1) | Pb | Sa |
| 11110 | (0, 1, 1, 0) | Pa | Sa |
| 11111 | (1, 1, 1, 1) | Pb | Sb |

FIG.10

MAPPING RULE Rb'

| BIT LABEL | SYMBOL SEQUENCE | START PATTERN | TERMINATION PATTERN |
|---|---|---|---|
| 00000 | (0, -1, -1, -1) | Pb | Sa |
| 00001 | (-1, -1, -1, 0) | Pa | Sb |
| 00010 | (0, -1, -1, 1) | Pb | Sb |
| 00011 | (-1, -1, 0, 0) | Pa | Sa |
| 00100 | (0, -1, 0, 1) | Pb | Sb |
| 00101 | (-1, -1, 1, -1) | Pa | Sa |
| 00110 | (0, -1, 1, 0) | Pb | Sa |
| 00111 | (-1, -1, 1, 1) | Pa | Sb |
| 01000 | (0, 0, 0, -1) | Pb | Sa |
| 01001 | (-1, 0, 0, 0) | Pa | Sb |
| 01010 | (0, 0, 1, 1) | Pb | Sb |
| 01011 | (-1, 0, 1, 0) | Pa | Sa |
| 01100 | (1, -1, -1, 0) | Pb | Sb |
| 01101 | (-1, 1, -1, -1) | Pa | Sa |
| 01110 | (1, -1, 0, 0) | Pb | Sb |
| 01111 | (-1, 1, -1, 1) | Pa | Sb |
| 10000 | (1, -1, 1, -1) | Pb | Sa |
| 10001 | (-1, 1, 0, 0) | Pa | Sb |
| 10010 | (1, -1, 1, 1) | Pb | Sb |
| 10011 | (-1, 1, 1, 0) | Pa | Sa |
| 10100 | (1, 0, -1, 0) | Pb | Sb |
| 10101 | (0, 0, -1, -1) | Pa | Sa |
| 10110 | (1, 0, 0, 0) | Pb | Sa |
| 10111 | (0, 0, -1, 1) | Pa | Sb |
| 11000 | (1, 1, -1, -1) | Pb | Sa |
| 11001 | (0, 1, -1, 0) | Pa | Sb |
| 11010 | (1, 1, -1, 1) | Pb | Sb |
| 11011 | (0, 1, 0, -1) | Pa | Sa |
| 11100 | (1, 1, 0, 0) | Pb | Sb |
| 11101 | (0, 1, 1, -1) | Pa | Sa |
| 11110 | (1, 1, 1, 0) | Pb | Sa |
| 11111 | (0, 1, 1, 1) | Pa | Sb |

STORAGE DEVICE AND STORAGE METHOD

CROSS-REFERENCE TO RELATED APPLICATIONS

This application is based upon and claims the benefit of priority from Japanese Patent Application No. 2018-202515, filed on Oct. 29, 2018; the entire content of which are incorporated herein by reference.

FIELD

Embodiments described herein relate generally to a storage device and a storage method.

BACKGROUND

In a storage device such as a magnetic disk device, in each track, a value of an information bit is represented according to a magnetization direction on a recording medium. At this time, it is desirable to improve a recording density of information.

BRIEF DESCRIPTION OF THE DRAWINGS

FIGS. 2A to 2E are diagrams illustrating a termination pattern and a start pattern of a symbol sequence, and a quadruple up-sampled sequence and an optimized bit sequence thereof in the embodiment;

FIG. 3 is a diagram illustrating one mapping rule in the embodiment;

FIG. 4 is a diagram illustrating another mapping rule in the embodiment;

FIG. 9 is a diagram illustrating one mapping rule in a modification of the embodiment;

FIG. 10 is a diagram illustrating another mapping rule in the modification of the embodiment;

DETAILED DESCRIPTION

Figure 1:
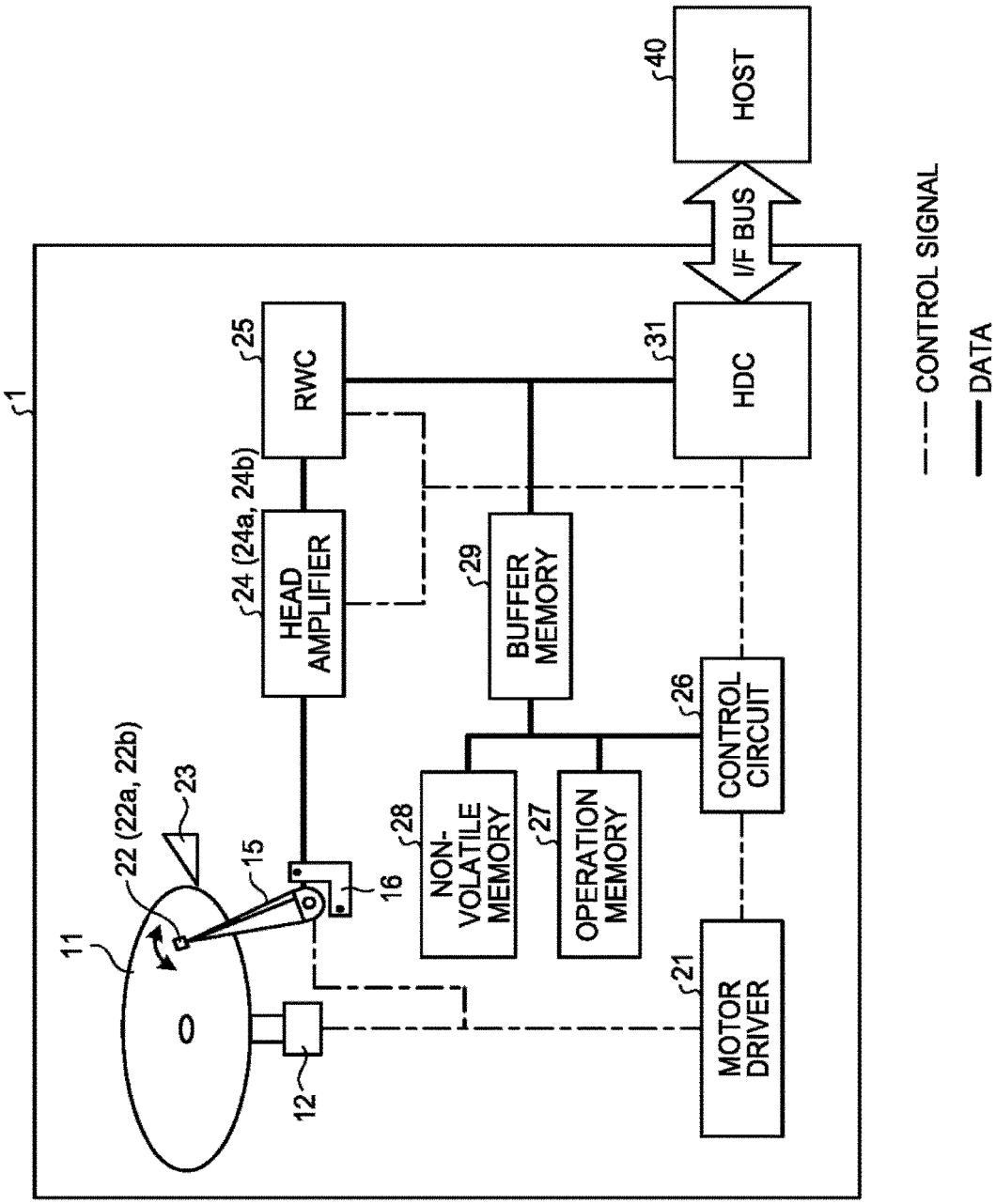
FIG. 1 is a diagram illustrating a configuration of a storage device according to an embodiment.

In general, according to one embodiment, there is provided a storage device including a selection circuit, a first conversion circuit, a second conversion circuit, a recording medium, and a readback circuit. The selection circuit selects one mapping rule from a plurality of mapping rules in which each of bit labels having a bit length of (n+1) or more is mapped to n M-ary symbols, when M is defined as an integer of 3 or more and n is defined as an integer of 2 or more. The first conversion circuit converts a data block in data into an M-ary symbol sequence using the selected one mapping rule. The second conversion circuit converts the converted M-ary symbol sequence into an M-step pulse width signal. The recording medium records the converted M-step pulse width signal. The readback circuit equalizes the signal read from the recording medium to the M-ary symbol sequence and restores the data.

Exemplary embodiments of a storage device will be explained below in detail with reference to the accompanying drawings. The present invention is not limited to the following embodiments.

Embodiment

A storage device 1 according to the embodiment will be described. The storage device 1 has a recording medium, and records information on the recording medium according to a request from a host 40. The recording medium includes, for example, a disk medium (for example, a magnetic disk, an optical disk, or a magneto-optical disk), a semiconductor memory (for example, a magnetic memory or a magnetic wall memory), and the like. The storage device 1 is, for example, a magnetic disk device, an SSD, a magneto-optical disk device, an optical disk device, a magnetic memory device, or the like. In the following description, the case where the recording medium is the disk medium (magnetic disk) and the storage device 1 is the magnetic disk device is described as an example. However, the present embodiment is applicable to other cases.

For example, the storage device 1 records information on the recording medium 11 via a head 22 and reads a signal from the recording medium 11 via the head 22. Specifically, the storage device 1 includes a recording medium 11, a spindle motor 12, a motor driver 21, a head 22, an actuator arm 15, a voice coil motor (VCM) 16, a lamp 23, a head amplifier 24, a read/write channel (RWC) 25, a hard disk controller (HDC) 31, a buffer memory 29, and a control circuit 26.

The recording medium 11 is rotated by a spindle motor 12 at a predetermined rotation speed about a rotation axis. The rotation of the spindle motor 12 is driven by the motor driver 21. The recording medium 11 may be a disk medium such as the magnetic disk or the magneto-optical disk, for example. The recording medium 11 has a perpendicular magnetic recording layer, for example. For example, a plurality of servo areas extending in a radial direction from the vicinity of the center of the recording medium 11 are defined on a surface and a back surface of the recording medium 11. The servo areas can be disposed at equal intervals in a circumferential direction. For example, servo information including servo patterns is recorded in the servo areas. Further, a plurality of tracks are defined concentrically from the vicinity of the center of the recording medium 11, on the surface and the back surface of the recording medium 11 by the servo patterns. Further, in the respective tracks, sector areas including servo areas, sync marks, and data areas are repeatedly disposed. The sync mark indicates a head of the data area.

The head 22 writes or reads data with respect to the recording medium 11 by a recording head 22a and a reading head 22b provided in the head 22. Further, the head 22 is located at a tip of the actuator arm 15 and is moved along a radial direction (cross track direction) of the recording medium 11 by the VCM 16 driven by the motor driver 21. When the rotation of the recording medium 11 is stopped, the head 22 is retracted onto the lamp 23.

The head amplifier 24 has a recording amplifier 24a and a reading amplifier 24b. The reading amplifier 24b amplifies and outputs a signal read from the recording medium 11 by the head 22 and supplies the signal to the RWC 25. Further, the recording amplifier 24a amplifies signal for writing data to the recording medium 11, supplied from the RWC 25, and supplies the signal to the head 22.

The HDC 31 performs control of transmission and reception of data performed between the host 40 and the HDC 31 via an I/F bus, control of the buffer memory 29, and data error correction processing for the recording data. The buffer memory 29 is used as a cache of data transmitted and received between the host 40 and the buffer memory 29. Further, the buffer memory 29 is used to temporarily store data read from the recording medium 11, data to be written to the recording medium 11, or control firmware read from the recording medium 11.

The RWC 25 performs code modulation on data to be written to the recording medium 11, supplied from the HDC 31, and supplies the data to the head amplifier 24. Further, the RNC 25 performs code demodulation on the signal read from the recording medium 11 and supplied from the head amplifier 24 and outputs the signal as digital data to the HDC 31.

An operation memory 27 (for example, a static random access memory (SRAM)), a non-volatile memory 28 (for example, flash read only memory (Flash ROM)), and a buffer memory 29 for temporary storage (for example, a dynamic random access memory (D are connected to the control circuit 26. The control circuit 26 performs overall control of the storage device 1, according to the firmware stored in advance in the non-volatile memory 28 and the recording medium 11. The control circuit 26 is a processor such as a CPU, for example, and is mounted as an IC (circuit). The firmware includes initial firmware and control firmware used for a normal operation. The initial firmware to be first executed at the startup is stored in the non-volatile memory 29, for example. The control firmware may include a part of functions of a controller circuit 50 (see FIG. 5) as described later. Further, the control firmware to be used for the normal operation is recorded on the recording medium 11, and under control according to the initial firmware, the control firmware is temporarily read from the recording medium 11 to the buffer memory 29 and then stored in the operation memory 27.

In the storage device 1, a value of an information bit is represented by a magnetization direction on the recording medium 11. For this reason, if the recording density on the recording medium 11 is increased, inter-symbol interference may occur and a quality of a readback signal may be degraded. For example, in an information recording method of recording binary symbols on the recording medium 11, if the recording density is increased, the inter-symbol interference is likely to occur, so that it is difficult to realize both suppression of the degradation of the quality of the readback signal and improvement of the recording density of the information.

On the other hand, in order to record multi-level symbols on the recording medium 11, it is considered that two adjacent sub-tracks are provided in the track in the storage device 1. In this case, in order to cause a result (desired signal) of combining the two adjacent sub-tracks to take a desired ternary amplitude value, it is required to take timing synchronization of recording bits between adjacent sub-tracks configuring one sector, when the desired signal is detected. There is a possibility that it is difficult to realize synchronous recording between the two adjacent sub-tracks in the storage device 1 having one recording head, and there is a possibility that throughput performance of a recording time may be degraded even if the synchronous recording can be realized.

On the other hand, it is considered that user data is converted into multi-level symbol sequences in units of data blocks of a predetermined bit length, the converted multi-level symbol sequences are converted into multi-step pulse width signals, and the signals are recorded on the recording medium. In this case, it is possible to realize multi-level recording on the recording medium 11 without providing a plurality of sub-tracks in the track. However, a pulse width of the signal may be shortened at a boundary between the converted symbol sequences, and there is a possibility that it is difficult to improve the recording density of the signal on the recording medium 11.

Therefore, in the present embodiment, in the storage device 1, a plurality of types of mapping rules in which bit labels are mapped to multi-level symbol sequences are prepared, and a mapping rule to be used for conversion into a subsequent multi-level symbol sequence is adaptively selected according to a termination pattern of an previous multi-level symbol sequence. As a result, the pulse width of the signal is suppressed from being shortened at the boundary between the symbol sequences and the recording density of the signal is improved.

Specifically, on the basis of a magnetic recording/readback method using multi-step pulse width modulation (PWM), at the recording, according to a termination condition of a modulation block at a time t, a mapping rule used at a time t+1 is switched and a recording sequence is generated. A selective switching standard of the mapping rule is set so that a minimum magnetization inversion interval is maintained at a recording symbol width or more in a multi-step PWM recording sequence. At the readback, since information regarding the mapping rule used at the recording cannot be grasped, blind estimation for blindly estimating the mapping rule used at the recording is performed, and data restoration is performed according to the estimated mapping rule. As such, by switching the mapping rule in a time-varying manner and generating the recording sequence, it is possible to generate a low-resolution PWM recording waveform at a modulation rate higher than that of a method of recording a binary symbol. As a result, a recording density higher than that of the method of recording the binary symbol can be realized.

Next, the concept of recording processing in the storage device 1 will be described. When M is defined as an integer of 3 or more and n is defined as an integer of 2 or more, the storage device 1 divides user data (binary data) into units of (n+1)-bit data blocks, converts the (n+1)-bit data blocks into a symbol sequence including n M-ary symbols, further converts the M-ary symbol sequence into an M-step PWM signal, and records the signal on the recording medium 11. In the description of the present embodiment, the case where the data block unit is (n+1) bits is described as an example. However, the data block unit may be K bits (K is an integer of (n+1) or more) and the data block unit is not limited to (n+1) bits.

When the M-ary symbol sequence is converted into the M-step PWM signal, the storage device 1 up-converts a bit rate of the signal into N times (N is an integer of or more) and generates a bit sequence. In the case of N=2×(M−1), the M-ary symbol is converted into a bit sequence in which the number of "0" and "1" in 2×(M−1) bits is changed in M steps. At the same time, the storage device 1 changes the bit order in the bit sequence so that the same bit values are continuous as much as possible, to obtain an optimized bit sequence. At this time, deliberation is made so that the same bit values are continuous as much as possible at the boundary between the symbol sequences.

In the case of M=3 and n=4, the storage device 1 converts the symbol into a bit sequence of a quadruple density per symbol, according to a conversion rule illustrated in FIG. 2A. FIG. 2A is a diagram illustrating an example of a conversion rule to be used when the M-ary symbol sequence is converted into the M-step signal. A left column of a table of FIG. 2A indicates a value of one symbol and a right column indicates a bit sequence in which a bit rate is up-converted into 4 times and PWM modulation is applied. For example, symbol values "−1", "0", and "1" are converted into quadruple up-sampled sequences "0000", "0011" and "1111", respectively.

At this time, the following sequence pattern 1 and sequence pattern 2 are considered as a pattern of a ternary symbol sequence.

The sequence pattern 1 is a pattern of a ternary symbol represented by the following formula 1 or formula 2, when a symbol value $I \in \pm 1$ and symbol values $X, Y \in 0, \pm 1$ are set.

$$X, I, \{0: \text{even (even number)}\}, -I, Y \quad \text{Formula 1}$$

$$X, I, \{0: \text{odd (odd number)}\}, I, Y \quad \text{Formula 2}$$

In the pattern of the formula 1, one and the other of the symbol values "1" and "−1" are arranged on both sides of a sequence of the even number of continuous symbol values "0". If the pattern of the formula 1 is converted into the quadruple up-sampled sequence and optimized, there may occur a portion where only two bit values "1" are continuous, like (1111, {1100, 0011, 1100, 0011}, 0000), in the case of I=1, for example.

In the pattern of the formula 2, the same symbol value "1" or "−1" is arranged on both sides of a sequence of the odd number of continuous symbol values "0". If the pattern of the formula 2 is converted into the quadruple up-sampled sequence and optimized, there may occur a portion where only two bit values "1" are continuous, like (1111, {1100, 0011, 0011}, 1111), in the case of I=1, for example.

That is, if the sequence pattern 1 is adopted, there is a possibility that a high-resolution pulse (that is, a short time width pulse) occurs on the PWM signal.

On the other hand, the sequence pattern is a pattern of a ternary symbol represented by the following formula 3 or formula 4, when a symbol value $I \in \pm 1$ and symbol values $X, Y \in 0, \pm 1$ are set.

$$X, I, \{0: \text{odd (odd number)}\}, -I, Y \quad \text{Formula 3}$$

$$X, I, \{0: \text{even (even number)}\}, I, Y \quad \text{Formula 4}$$

In the pattern of the formula 3, one and the other of the symbol values "1" and "−1" are arranged on both sides of a sequence of the odd number of continuous symbol values "0". If the pattern of the formula 3 is converted into the quadruple up-sampled sequence and optimized, it is possible to prevent occurrence of a portion where the number of continuous bit values "1" is less than four, like (1111, {1100, 0011, 1100}, 0000), in the case of I=1, for example.

In the pattern of the formula 4, the same symbol value "1" or "−1" is arranged on both sides of a sequence of the even number of continuous symbol values "0". If the pattern of the formula 4 is converted into the quadruple up-sampled sequence and optimized, it is possible to prevent occurrence of a portion where the number of continuous bit values "1" is less than four, like (1111, {1100, 0011, 1100, 0011}, 1111), in the case of I=1, for example.

That is, if the sequence pattern 2 is adopted, occurrence of the high-resolution pulse on the PWM signal can be suppressed, as compared with the case where the sequence pattern 1 is adopted. Therefore, in order to exclude the sequence pattern 1 and obtain the sequence pattern 2, in a symbol sequence and between symbol sequences, a mechanism for determining a plurality of mapping rules and selectively switching between them is considered.

In the case of M=3 and n=4, in each mapping rule, a bit label of a 5-bit ((n+1)-bit) length is mapped to 4 n) ternary symbols. Considering obtaining the sequence pattern 2 between the symbol sequences, the termination pattern includes k (k is an integer of 4 or less) ternary symbols configuring a termination portion in a sequence of four ternary symbols, and can be classified into two types of a termination pattern Sa illustrated in FIG. 2S and a termination pattern Sb illustrated in FIG. 2C. A start pattern includes k (k is an integer of 4 or less) ternary symbols configuring a start portion in a sequence of four ternary symbols, and can be classified into two types of a start pattern Pa illustrated in FIG. 2C and a start pattern Pb illustrated in FIG. 2D. FIG. 2B is a diagram illustrating the termination pattern Sa of the symbol sequence and a quadruple up-sampled sequence and an optimized bit sequence thereof. FIG. 2C is a diagram illustrating the termination pattern Sb of the symbol sequence and a quadruple up-sampled sequence and an optimized bit sequence thereof. FIG. 2C is a diagram illustrating the start pattern Pa of the symbol sequence and a quadruple up-sampled sequence and an optimized bit sequence thereof. FIG. 2D is a diagram illustrating the start pattern Pb of the symbol sequence and a quadruple up-sampled sequence and an optimized bit sequence thereof.

If the termination pattern Sa is converted into the quadruple up-sampled sequence and optimized, as illustrated by a broken line in FIG. 2B, the sequence is terminated with two or more continuous bit values "1". If the start pattern Pa is converted into the quadruple up-sampled sequence and optimized, as illustrated by a broken line in FIG. 2D, the sequence starts from two or more continuous bit values "1". Therefore, in the case where the termination pattern of the previous symbol sequence is Pa, if a mapping rule where the start pattern is Pa is selected, the sequence pattern 2 can be obtained in the vicinity of the boundary between the symbol sequences, and it is possible to prevent occurrence of a portion where the number of continuous bit values "1" is less than four. That is, it is possible to suppress occurrence of the high-resolution pulse in the vicinity of the boundary between the symbol sequences.

If the mapping rule where the start pattern is Pa is configured while the sequence pattern 2 is adopted, for example, a mapping rule Ra illustrated in FIG. 3 is obtained. FIG. 3 is a diagram illustrating one mapping rule Ra. In the mapping rule Ra, bit labels of 5-bit lengths different from each other are mapped to sequences of four ternary symbols different from each other, including the start pattern Pa. In each of the bit labels "00000" to "11111", although the start pattern is Pa, the termination pattern is Sa or Sb.

It should be noted that the mapping rule Ra is not limited to the example illustrated in FIG. 3. In a mapping rule in which each of bit labels of (n+1)-bit lengths is mapped to n M-ary symbols, different bit patterns of (n+1) bits may be recorded in a column of the bit labels, and different symbol sequences each including n M-ary symbols and including the start pattern corresponding to Pa may be recorded in a column of the symbol sequences.

Further, if the termination pattern Sb is converted into the quadruple up-sampled sequence and optimized, as illustrated by a broken line in FIG. 2C, the sequence is terminated with two or more continuous bit values "0". If the start pattern Pb is converted into the quadruple sampled sequence and optimized, as illustrated by a broken line in FIG. 2E, the sequence starts from two or more continuous bit values "0". Therefore, in the case where the termination pattern of the previous symbol sequence is Sb, if the mapping rule where the start pattern is Pb is selected, the sequence pattern 2 can be obtained in the vicinity of the boundary between the symbol sequences, and it is possible to prevent occurrence of a portion where the number of continuous bit values "1" is less than four. That is, it is possible to suppress occurrence of the high-resolution pulse in the vicinity of the boundary between the symbol sequences.

If the mapping rule where the start pattern is Pb is configured while the sequence pattern 2 is adopted, for example, a mapping rule Rb illustrated in FIG. 4 is obtained. FIG. 4 is a diagram illustrating another mapping rule Rb. In the mapping rule Rb, bit labels of 5-bit lengths different from each other are mapped to sequences of four ternary symbols different from each other, including the start pattern Pb. In each of the bit labels "00000" to "11111", although the start pattern is Pb, the termination pattern is Pa or Sb.

It should be noted that the mapping rule Rb is not limited to the example illustrated in FIG. 4. In a mapping rule in which each of bit labels of (n+1)-bit lengths is mapped to n M-ary symbols, different bit patterns of (n+1) bits may be recorded in a column of the bit labels, and different symbol sequences each including n M-ary symbols and including the start pattern corresponding to Pb may be recorded in a column of the symbol sequences.

Figure 5:
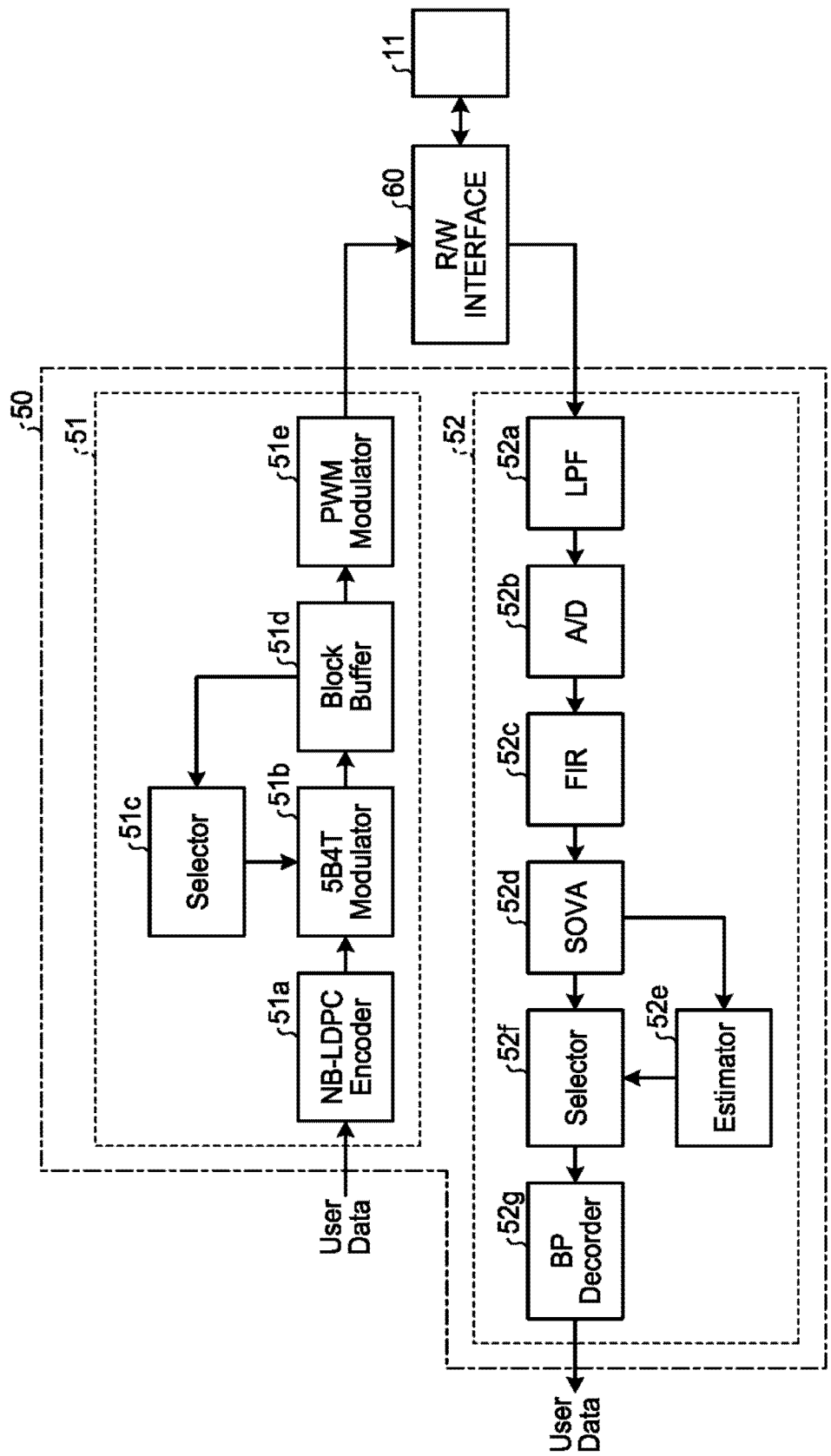
FIG. 5 is a diagram illustrating a configuration of a controller circuit in the embodiment.

Next, a specific implementation form of the recording processing in the storage device 1 will be described. A magnetic recording/readback system (controller circuit 50) having a modulation/demodulation function of selecting the mapping rule in a time-varying manner is configured as illustrated in FIG. 5, for example. FIG. 5 is a diagram illustrating a configuration of the controller circuit 50. Each element in the controller circuit 50 illustrated in FIG. 5 has a functional configuration, and may be implemented as hardware (for example, as a system on chip) in the RNC 25 (see FIG. 1) or the like, for example. Alternatively, each element in the controller circuit 50 illustrated in FIG. 5 may be implemented as software (for example, as a functional module to be developed collectively or sequentially according to the progress of processing in the operation memory 27 or the like by the control circuit 26 or the like or as the processing progresses) in the control circuit 26 (see FIG. 1) or the like, for example. Alternatively, some elements in the controller circuit 50 illustrated in FIG. 5 may be implemented as hardware in the RWC 25 or the like, and the remaining elements may be implemented as software in the control circuit 26 or the like.

The controller circuit 50 has a recording circuit 51 and a readback circuit 52. The recording circuit records a signal based on user data (information bit) on the recording medium 11 via an R/W interface 60. The readback circuit 52 reads the recorded signal from the recording medium 11 via the R/W interface 60 and restores the user data. The R/W interface 60 can include the head 22, the head amplifier 24, and the RWC 25 (see FIG. 1), for example.

The recording processing in the storage device 1 can be implemented as the recording circuit 51 illustrated in FIG. 5. The recording circuit 51 has a nonbinary low-density parity-check (NB-LDPC) encoder (NB-LDPC Encoder) 51a, a first conversion circuit (5B4T Modulator) 51b, a selection circuit (Selector) 51c, a buffer circuit (Block Buffer) 51d, and a second conversion circuit (PWM Modulator) 51e.

The NB-LDPC encoder 51a performs LDPC encoding on the user data on GF $(2^{n+1})$ and generates a codeword. Here, GF $(2^{n+1})$ is used as a Galois extension field. However, the Galois extension field used in the LDPC encoding is not limited thereto. Further, here, an LDPC code is used as an error correction code for the user data as an example. However, the error correction code is not limited thereto, and another code system such as a convolutional code or a Reed Solomon (RS) code may be used.

In the case of performing the LDPC encoding, when an (n+1)-bit data block in the user data is recorded with a P signal according to n M-ary symbols, by using GF$(2^{n+1})$ at the encoding, the (n+1)-bit data block can be treated as a single element on GF$(2^{n+1})$.

The selection circuit 51c selects one mapping rule from a plurality of mapping rules. Each mapping rule is a mapping rule in which bit labels of (n+1)-bit lengths are mapped to n M-ary symbols. The plurality of mapping rules include a mapping rule including a first start pattern and a mapping rule including a second start pattern. The selection circuit 51c refers to an previous M-ary symbol sequence. The previous M-ary symbol sequence is converted by the first conversion circuit 51b and then supplied to the buffer circuit 51d and buffered in the buffer circuit 51d. The selection circuit 51c may access the buffer circuit 51d to acquire the previous M-ary symbol sequence. When a termination pattern of the previous M-ary symbol sequence is a first termination pattern, the mapping rule including the first start pattern corresponding to the first termination pattern is selected. When the termination pattern of the previous M-ary symbol sequence is a second termination pattern, the selection circuit 51c selects the mapping rule including the second start pattern corresponding to the second termination pattern.

For example, in the case of M=3 and n=4, the plurality of mapping rules include the mapping rule Ra illustrated in FIG. 3 and the mapping rule Rb illustrated in FIG. 4. The mapping rule Re is a mapping rule including the start pattern Pa (see FIG. 2D). The mapping rule Rb is a mapping rule including the start pattern Pb (see FIG. 2E). The selection circuit 51c refers to an previous ternary symbol sequence, and selects the mapping rule Ra including the start pattern Pa corresponding to the termination pattern Sa when a termination pattern of the previous ternary symbol sequence is Sa. When the termination pattern of the previous ternary symbol sequence is Sb, the selection circuit 51c selects the mapping rule Rb including the start pattern Pb corresponding to the termination pattern Sb.

The selection circuit 51c notifies the first conversion circuit 51b of a selection result of the mapping rule. For example, when the first conversion circuit 51b has management information in which the mapping rule and identification information thereof are associated with respect to the plurality mapping rules, the selection circuit 51c may notify the first conversion circuit 51b of the identification information of the selected mapping rule as the selection result of the mapping rule.

The first conversion circuit 51b receives the encoded user data from the NB-LDPC encoder 51a and receives the selection result of the mapping rule from the selection circuit 51c. The first conversion circuit 51b specifies the mapping rule to be used for conversion, according to the selection result of the mapping rule. For example, in the case where the first conversion circuit 51b has the management information in which the mapping rule and the identification information thereof are associated with respect to the plurality of mapping rules, if the first conversion circuit 51b receives the identification information of the mapping rule as the selection result of the mapping rule from the selection circuit 51c, the first conversion circuit 51b specifies the mapping rule corresponding to the identification information in the management information as the mapping rule to be used for conversion. The first conversion circuit 51b converts the (n+1)-bit data block in the user data into a symbol sequence including n M-ary symbols, using the specified mapping rule.

In the case of M=3 and n=4, if the termination pattern of the previous ternary symbol sequence is Sa, the first conversion circuit 51b converts a 5-bit data block into a symbol sequence including four ternary symbols, using the mapping rule Ra illustrated in FIG. 3. If the termination pattern of the previous ternary symbol sequence is Sb, the first conversion circuit 51b converts a 5-bit data block into a symbol sequence, including four ternary symbols, using the mapping rule Rb illustrated in FIG. 4.

Figure 6:
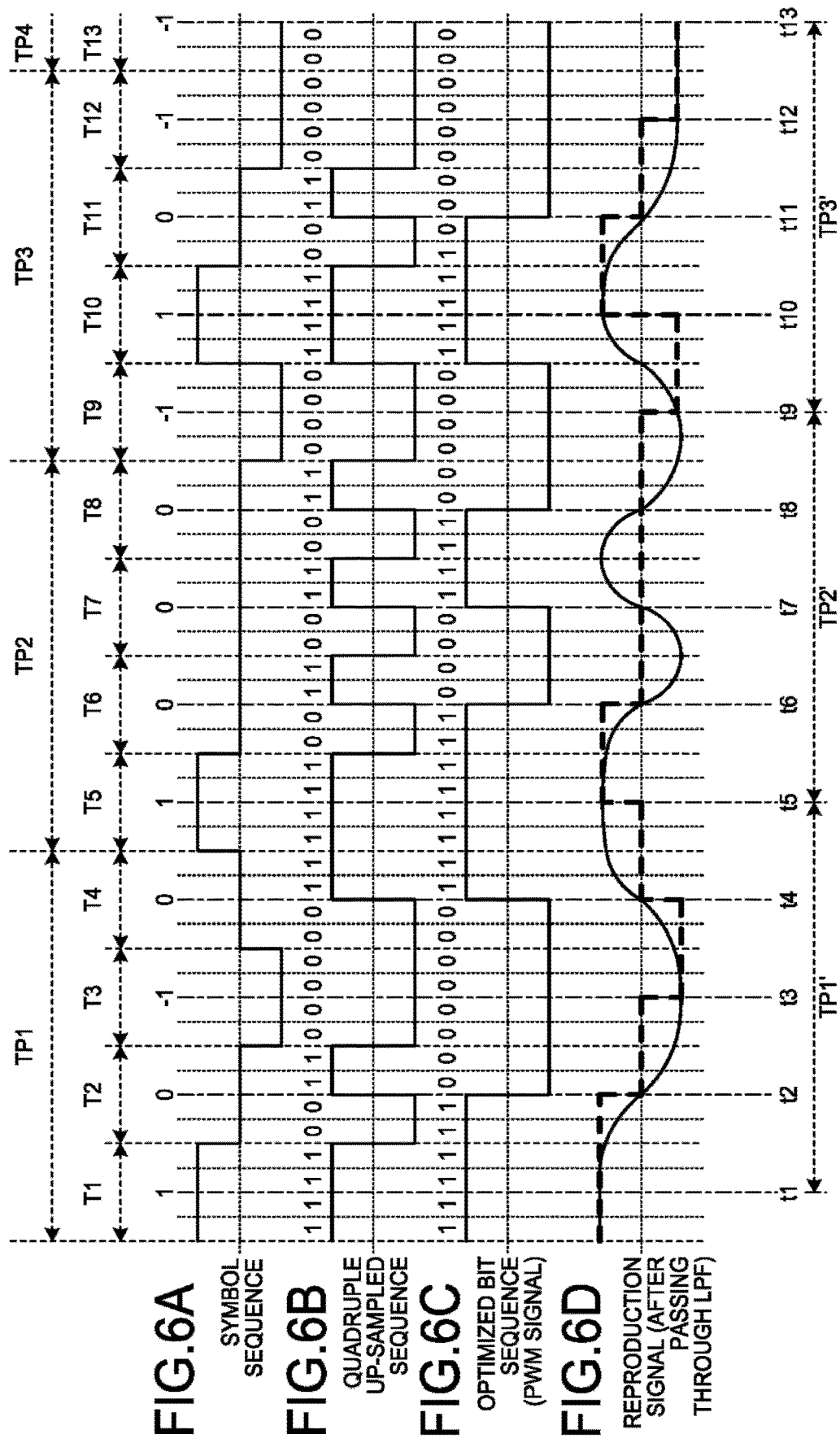
FIGS. 6A to 6D are waveform diagrams illustrating an operation of the storage device in the embodiment.

For example, as illustrated in FIG. 6A, in a data block period TP1 including symbol cycles T1 to T4, the first conversion circuit 51b converts a 5-bit data block "10100" into a sequence "1, 0, −1, 0" of four ternary symbols, using the mapping rule Rb. The selection circuit 51c selects the mapping rule Rb, according to the termination pattern Sb of the symbol sequence "1, 0, −1, 0". In a data block period TP2 including symbol cycles T5 to T8, the first conversion circuit 51b converts a 5-bit data block "10110" into a sequence "1, 0, 0, 0" of four ternary symbols, using the mapping rule Rb. The selection circuit 51c selects the mapping rule Ra, according to the termination pattern Sa of the symbol sequence "1, 0, 0, 0". The first conversion circuit 51b converts a 5-bit data block "10000" into a sequence "−1, 1, 0, −1" of four ternary symbols, using the mapping rule Ra. The selection circuit S1c selects the mapping rule Re, according to the termination pattern Sa of the symbol sequence "−1, 1, 0, −1". FIG. 6A is a waveform diagram illustrating a processing result (output signal) of the first conversion circuit 51b in the controller circuit 50.

The first conversion circuit 51b supplies the converted symbol sequence to the buffer circuit 51d. The buffer circuit 51d buffers the converted symbol sequence for a predetermined period. For example, every time the converted symbol sequence is supplied from the first conversion circuit 51b, the buffer circuit 51d may supply the buffered symbol sequence to the second conversion circuit 51e and may update the symbol sequence to be buffered.

For example, as illustrated in FIG. 6A, the buffer circuit 51d buffers the symbol sequence "1, 0, −1, 0" in the data block period TP1. If the buffer circuit 51d receives a next symbol sequence "1, 0, 0, 0" from the first conversion circuit 51b in the data block period TF2, the buffer circuit 51d supplies the buffered symbol sequence to the second conversion circuit 51e and updates the symbol sequence to be buffered to "1, 0, 0, 0". If the buffer circuit 51d receives a next symbol sequence "−1, 1, 0, −1" from the first conversion circuit 51b in a data block period TP3, the buffer circuit 51d supplies the buffered symbol sequence to the second conversion circuit 51e and updates the symbol sequence to be buffered to "−1, 1, 0, −1".

The second conversion circuit 51e receives an M-ary symbol sequence from the first conversion circuit 51b via the buffer circuit 51d. The second conversion circuit 51e converts the M-ary symbol sequence into an M-step pulse width signal. When the second conversion circuit 51e converts the M-ary symbol sequence into the M-step kWh signal, the second conversion circuit 51e up-converts a bit rate of the signal into N times (N is an integer of 2 or more) and generates a bit sequence. In the case of N=2×(M−1), the M-ary symbol is converted into a hit sequence in which the number of "0" and "1" in 2×(M−1) bits is changed in M steps.

In the case of M=3 and n=4, according to the conversion rule illustrated in FIG. 2A, the second conversion circuit 51e converts the symbol into a bit sequence of a quadruple density per symbol, changes the bit order in the bit sequence so that the same bit values are continuous as much as possible, and obtains an optimized bit sequence (see FIGS. 2B to 2E).

For example, as illustrated in FIG. 6B, in the data block period TP1 including the symbol cycles T1 to T4, the second conversion circuit 51e converts the symbol sequence "1, 0, −1, 0" into a bit sequence "1111, 0011, 0000, 0011" in which the bit rate is up-converted into four times. Further, in the data block period TP1, the second conversion circuit 51e converts the bit sequence "1111, 0011, 0000, 0011" into an optimized bit sequence "1111, 1100, 0000, 0011". In the data block period TP2 including the symbol cycles 15 to 18, the second conversion circuit 51e converts the symbol sequence "1, 0, 0, 0" into a bit sequence "1111, 0011, 0011, 0011" in which the bit rate is up-converted into four times. Further, in the data block period TP2, the second conversion circuit 51e converts the bit sequence "1111, 0011, 0011, 0011" into an optimized bit sequence "1111, 1100, 0011, 1100". In the data block period TP3 including the symbol cycles T0 to T12, the second conversion circuit 51e converts the symbol sequence "−1, 1, 0, −1" into a bit sequence "0000, 1111, 0011, 0000" in which the bit rate is up-converted into four times. Further, in the data block period 183, the second conversion circuit 51e converts the bit sequence "0000, 1111, 0011, 0000" into an optimized bit sequence "0000, 1111, 1100, 0000". FIG. 6B is a waveform diagram illustrating a quadruple up-sampled sequence converted by the second conversion circuit 51e in the controller circuit 50. FIG. 6C is a waveform diagram illustrating an optimized bit sequence further converted by the second conversion circuit 51e in the controller circuit 50.

The second conversion circuit 51e performs D/A conversion on the optimized bit sequence to obtain a recording signal of an analog format, and records the recording signal on the recording medium 11 via the R/W interface 60. The second conversion circuit 51e record the analog signal according to the optimized bit sequence illustrated in FIG. 6C as the PWM signal on the recording medium 11. As illustrated in FIG. 6C, the signal recorded on the recording medium 11 has a waveform in which the time width of the pulse is maintained at a minimum magnetization inversion interval or more.

Figure 7:
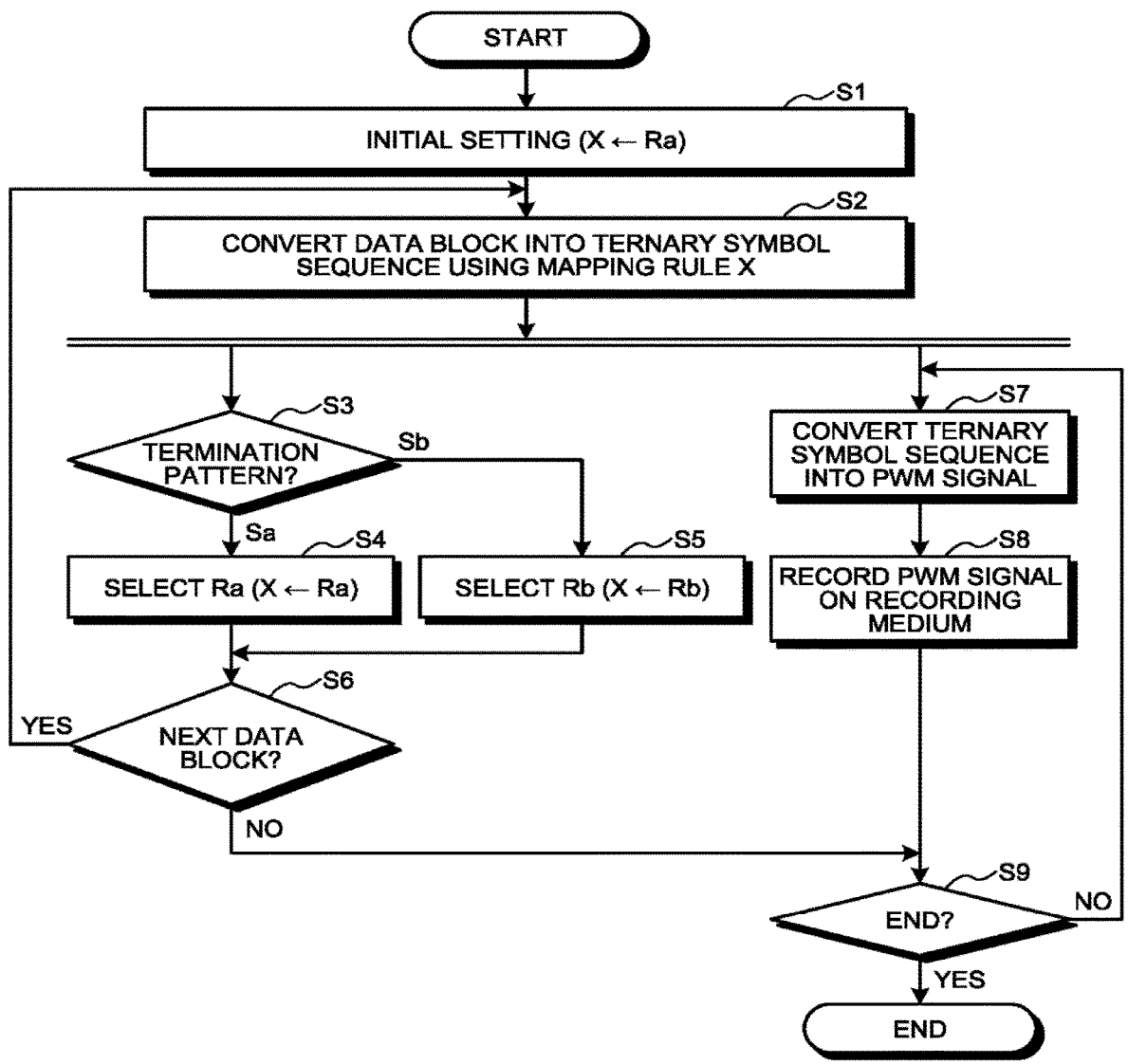
FIG. 7 is a flowchart illustrating recording processing in the embodiment.

Next, a flow of the recording processing in the storage device 1 will be described using FIG. 7. FIG. 7 is a flowchart illustrating the recording processing. FIG. 7 illustrates an example of a flow of the recording processing in the case of M=3 and n=4.

The storage device 1 performs initial setting at predetermined timing such as startup (S1). At this time, the storage device 1 sets a mapping rule X to be used for conversion in the first conversion circuit 51b to the default mapping rule Ra as one of the initial setting. The storage device 1 converts a 5-bit data block in the user data into a symbol sequence including four ternary symbols, using the mapping rule X (S2). The storage device 1 performs processing of S3 to S6 and processing of S7 to S9 in parallel after 32.

If the conversion into the ternary symbol sequence (S2) is performed, the storage device 1 refers to a termination pattern of the converted ternary symbol sequence (S3). If the termination pattern is Sa ("Sa" in S3), the storage device 1 selects the mapping rule Ra as the mapping rule X to be used in the conversion of S2 (S4). If the termination pattern is Sb ("Sb" in S3), the storage device 1 selects the mapping rule Rb as the mapping rule X to be used in the conversion of S2 (S5). If a next data block exists (Yes in S6), the storage device 1 returns the processing to S2, and if the next data block does not exist (No in S6), the storage device 1 causes the processing to proceed to S9.

Further, if the conversion into ternary symbol sequence (S2) is performed, the storage device 1 converts the converted ternary symbol sequence into a three-step P signal (57) and records the converted PWM signal on the recording medium 11 (S8). The storage device 1 determines whether or not to end the recording processing (S9). If the next data block exists or the processing of S7 and S8 for the current data block is not completed (No in S9), the storage device 1 returns the processing to S7, and if the next data block does not exist and the processing of S7 and S8 for the current data block is completed (Yes in S9), the storage device 1 ends the recording processing.

Next, the concept of the readback processing in the storage device 1 will be described. The storage device 1 equalizes the signal read from the recording medium to the M-ary symbol sequence and restores the data. At this time, the storage device 1 specifies the mapping rule used in the recording processing and restores the data from the symbol sequence, but cannot grasp the mapping rule used in the recording processing. Therefore, the storage device 1 performs the blind estimation for blindly estimating the mapping rule used in the recording processing. In the blind estimation, equalization processing is performed on all symbol sequences of all possible mapping rules used in the recording processing. Equalization information obtained here becomes likelihood information (that is, log likelihood) of each signal point in a plurality of mapping rules.

In the case of M=3 and n=4, in the recording processing, there is a definition of the symbol sequences by the two mapping rules Ra and Rb, with respect to the same bit label. For this reason, the likelihood information by both the symbol sequences is temporarily obtained by the equalization processing. That is, likelihood information (that is, log likelihood) of the respective symbol sequences "−1, −1, −1, −1" to "0, 1, 1, 1" of the mapping rule Ra illustrated in FIG. 3 and likelihood information (that is, log likelihood) of the respective symbol sequences "−1, −1, −1, −1" to "0, 1, 1, 1" of the mapping rule Ra illustrated in FIG. 4 are obtained.

Further, in the blind estimation, a mapping rule used for a target block is estimated according to an equalization result of the previous block and an equalization result of the subsequent signal block. That is, in the blind estimation, in order to improve accuracy of the likelihood information of each symbol sequence, the likelihood information of the previous and subsequent blocks is utilized to generate combined likelihood information (that is, also referred to as combined log likelihood or joint metric).

Since the mapping rule to be used in the target block is selected according to the termination pattern of the previous block in the recording processing, it is considered that the likelihood of the termination pattern of the previous block indicates the likelihood of the mapping rule of the target block. The likelihood of the termination pattern of the previous block is obtained from the likelihood information of the previous block, and the likelihood of the termination pattern of the previous block is weighted as the likelihood of the mapping rule of the target block with respect to the likelihood information of the symbol sequence.

Since the mapping rule to be used in the immediately subsequent block is selected according to the termination pattern of the target block in the recording processing, it is considered that the likelihood of the mapping rule of the subsequent block indicates the likelihood of the termination pattern of the target block. The likelihood of the mapping rule of the subsequent block is obtained from the likelihood information of the subsequent block, and the likelihood of the mapping rule of the subsequent block is weighted as the likelihood of the termination pattern of the target block with respect to the likelihood information of the symbol sequence.

That is, in the blind estimation, the likelihood of the termination pattern of the previous block is obtained on the basis of the likelihood information of the previous block, and the likelihood of the mapping rule used for the subsequent block is obtained on the basis of the likelihood information of the subsequent block. In addition, combined likelihood information of the target block in which the likelihood of the termination pattern of the previous block and the likelihood of the mapping rule used for the subsequent block are combined is obtained for each symbol sequence of a plurality of mapping rules.

In the case of M=3 and n=4, Ra is selected as the mapping rule of the target block when the termination pattern of the previous block is Sa, and Rb is selected as the mapping rule of the target block when the termination pattern of the previous block is Sb. Further, Ra is selected as the mapping rule of the subsequent block when the termination pattern of the target block is Sa, and Rb is selected as the mapping rule of the subsequent block when the termination pattern of the target block is Sb.

For example, combined log likelihood JM(Ra(t), Sa(t)) of a symbol sequence (that is, any symbol sequence in which the termination pattern is described as Sa in FIG. 3) in which the mapping rule is Ra and the termination pattern is Sa for the target block is obtained by the following formula 5.

$$JM(Ra(t), Sa(t)) = \log(Ra(t), Sa(t)) + \Sigma\log(Sa(t-1)) - \Sigma\log(Ra(t+1)) \quad \text{Formula 5}$$

In the formula (5), log(Ra(t), Sa(t)) is likelihood information (that is, log likelihood) obtained by performing the equalization processing on the symbol sequence in which the mapping rule is Ra and the termination pattern is Sa for the target block. Σlog(Sa(t−1)) is obtained by combining likelihood information (that is, log likelihood) of all symbol sequences (that is, all symbol sequences in which the termination pattern is described as Sa in FIGS. 3 and 4) in which the termination pattern is Sa for the previous block. Σlog(Ra(t+1)) is obtained by combining likelihood information (that is, log likelihood) of all symbol sequences (that is, all symbol sequences illustrated in FIG. 3) in which the mapping rule is Ra for the subsequent block.

For example, combined log likelihood JM(Ra(t), Sb(t)) of a symbol sequence (that is, any symbol sequence in which the termination pattern is described as Sb in FIG. 3) in which the mapping rule is Ra and the termination pattern is Sb for the target block is obtained by the following formula 6.

$$JM(Ra(t), Sb(t)) = \log(Ra(t), Sb(t)) + \Sigma\log(Sa(t-1)) + \Sigma\log(Rb(t+1)) \quad \text{Formula 6}$$

In the formula (6), log(Ra(t), Sb(t)) is likelihood information (that is, log likelihood) obtained by performing the equalization processing on the symbol sequence in which the mapping rule is Ra and the termination pattern is Sb for the target block. Σlog(Sa(t−1)) is obtained by combining likelihood information (that is, log likelihood) of all symbol sequences (that is, all symbol sequences in which the termination pattern is described as Sa in FIGS. 3 and 4) in which the termination pattern is Sa for the previous block. Σlog(Rb(t+1)) is obtained by combining likelihood information (that is, log likelihood) of all symbol sequences (that is, all symbol sequences illustrated in FIG. 4) in which the mapping rule is Rb for the subsequent block.

For example, combined log likelihood JM(Rb(t), Sa(t)) of a symbol sequence (that is, any symbol sequence in which the termination pattern is described as Sa in FIG. 4) in which the mapping rule is Rb and the termination pattern is Sa for the target block is obtained by the following formula 7.

$$JM(Rb(t), Sa(t))=\log(Rb(t), Sa(t))+(Sb(t-1))+\Sigma\log(Ra(t+1)) \quad \text{Formula 7}$$

In the formula (7), log(Rb(t), Sa(t)) is likelihood information (that is, log likelihood) obtained by performing the equalization processing on the symbol sequence in which the mapping rule is Rb and the termination pattern is Sa for the target block log (Sb(t−1)) is obtained by combining likelihood information (that is, log likelihood) of all symbol sequences (that is, all symbol sequences in which the termination pattern is described as Sb in FIGS. 3 and 4) in which the termination pattern is Sb for the previous block. Σlog(Ra(t+1)) is obtained by combining likelihood information (that is, log likelihood) of all symbol sequences (that is, all symbol sequences illustrated in FIG. 3) in which the mapping rule is Ra for the subsequent block.

For example, combined log likelihood JM(Rb(t), Sb(t)) of a symbol sequence (that is, any symbol sequence in which the termination pattern is described as Sb in FIG. 4) in which the mapping rule is Rb and the termination pattern is Sb for the target block is obtained by the following formula 8.

$$JM(Rb(t), Sb(t))=\log(Rb(t), Sb(t))=\log(Sb(t-1))+\log(Rb(t+1)) \quad \text{Formula 8}$$

In the formula (8), log(Rb(t), Sb(t)) is likelihood information (that is, log likelihood) obtained by performing the equalization processing on the symbol sequence in which the mapping rule is Rb and the termination pattern is Sb for the target block. Σlog(Sb(t−1)) is obtained by combining likelihood information (that is, log likelihood) of all symbol sequences (that is, all symbol sequences in which the termination pattern is described as Sb in FIGS. 3 and 4) in which the termination pattern is Sb for the previous block. Σlog(Rb(t+1)) is obtained by combining likelihood information (that is, log likelihood) of all symbol sequences (that is, all symbol sequences illustrated in FIG. 4) in which the mapping rule is Rb for the subsequent block.

Further, in the blind estimation, for each bit label, combined likelihood information of a plurality of mapping rules is compared, a symbol sequence having the largest likelihood is adopted, and a mapping rule as an estimation result is configured. As a result, the plurality of mapping rules are grouped into one mapping rule.

In the case of M=3 and n=4, in the combined likelihood information (that is, the combined log likelihood) of the symbol sequences of the two mapping rules Ra and Rb with respect to the same bit label obtained, the symbol sequence having the large likelihood is selected as the recorded symbol sequence. As a result, the mapping rule as the estimation result is configured.

The combined likelihood information of each symbol sequence in the mapping rule as the estimation result is used as a likelihood value of each symbol sequence for FCC decoding processing of a subsequent step. According to this, even if the mapping rule applied at the recording is unknown at the readback processing, the readback side can select likelihood information for an appropriate signal point and can perform the readback processing.

Next, a specific implementation form of the feedback processing in the storage device 1 will be described. The readback processing in the storage device 1 can be implemented as the readback circuit 52 illustrated in FIG. 5. The readback circuit 52 has a low-pass filter (LPF) 52a, an AD converter (A/D) 52b, an FIR filter (FIR) 52c, a soft decision circuit (SOVA) 52d, an operation circuit (Estimator) 52e, an estimation circuit (Selector) 52f, and an NB-LDPC decoder (BP Decoder) 52g.

The low-pass filter 52a receives a readback signal of a PNN waveform read from the recording medium 11 by the reading head 22b and passing through the reading amplifier 24b. The low-pass filter 52a has a cutoff frequency obtained by multiplying a frequency of the signal of the PWM waveform by $1/(2N)=1/[2\times\{2\times(M-1)\}]=1/[4\times(M-1)]$. The low-pass filter 52a blunts the signal (readback signal of the PWM waveform) in which a bit rate is up-converted into N times and down-converts the bit rate into substantially $N\times2/(2N)=1$ times. The low-pass filter 52a supplies the processed signal to the A/D converter 52b.

For example, in the case of M=3, the low-pass filter 52a performs filter processing at a cutoff frequency of $1/(2\times4)=\frac{1}{8}$ band with respect to a recording signal (signal of the M waveform) band. Thereby, the low-pass filter 52a blunts a signal in which a bit rate is up-converted into four times with respect to the symbol sequence and down-converts the bit rate into substantially $4\times1/(2\times2)=1$ times to be a signal band of the original M-ary sequence.

That is, as illustrated by a solid line in FIG. 6D, the low-pass filter 52a blunts the recording signal (signal of the P waveform) illustrated in FIG. 6C and generates a feedback signal in which a bit rate is down-converted into substantially $4\times1/(2\times2)=1$ times. FIG. 6D is a waveform diagram illustrating a processing result (output signal) of the low-pass filter 52a in the controller circuit 50.

The A/D converter 52b performs down-sample processing at a sampling frequency of a 1/N band (that is, the bit rate is $N\times1/N=1$ times with respect to the symbol sequence) for the recording signal, with respect to the signal processed by the low-pass filter 52a. The A/D converter 52b performs down-sample processing at a sampling frequency required for an original ternary amplitude sequence, with respect to the signal processed by the low-pass filter 52a. The A/D converter 52b performs A/D conversion for performing sampling at center timing of the symbol cycle, for each symbol cycle substantially equivalent to that of the symbol sequence. Thereby, the A/D converter 52b down-converts the signal so that the bit rate is substantially one time of that of the symbol sequence, and reproduces a waveform of an M-ary amplitude value of the symbol sequence. That is, a desired signal of which a waveform is converted into a readback waveform having a desired M-ary amplitude is obtained.

For example, in the case of M=3, the A/D converter 52b performs down-sample processing at a sampling frequency of a ¼ band (that is, the bit rate of the symbol sequence) for the recording signal. That is, the A/D converter 52b performs A/D conversion at the center timing of the symbol cycle, for each symbol cycle substantially equivalent to that of the symbol sequence. As a result, a desired signal of which a waveform is converted into a readback waveform having a desired ternary amplitude can be obtained.

That is, the A/D converter 52b performs an A/D conversion at center timings t1 to t12 of the symbol cycles T1 to T12 illustrated by a one-dotted chain line in FIG. 6D, with respect to the signal processed by the low-pass filter 52a, illustrated by a solid line in FIG. 6D. Thereby, it can be seen that a readback signal (signal illustrated by a broken line in FIG. 6D) having the ternary amplitude similar as that of the symbol sequence illustrated in FIG. 6A is obtained.

The A/D converter 52b outputs the processed signal (desired signal) to the FIR filter 52c. The FIR filter 52c performs FIR equalization processing on the desired signal (digital signal), and inputs the signal to the soft decision circuit 52d.

The soft decision circuit 52d divides the signal after the FIR equalization into signal blocks corresponding to data blocks. The soft decision circuit 52d performs soft decision equalization processing on inter-symbol interference with respect to the signal block, on the basis of a soft output Viterbi algorithm (SOVA), and obtains likelihood information (that is, log likelihood) for the symbol sequence. At this time, the soft decision circuit 52d obtains likelihood information (that is, log likelihood) for all symbol sequences of all possible mapping rules used in the recording processing.

In the case of M=3 and n=4, likelihood information (that is, log likelihood) of the respective symbol sequences "−1, −1, −1, −1" to "0, 1, 1, 1" of the mapping rule Ra illustrated in FIG. 3 and likelihood information (that is, log likelihood) of the respective symbol sequences "−1, −1, −1, −1" to "0, 1, 1, 1" of the mapping rule Ra illustrated in FIG. 4 are obtained.

That is, as illustrated in FIG. 1D, the soft decision circuit 52d obtains likelihood information (that is, log likelihood) of all symbol sequences of all mapping rules, with respect to a signal block according to an A/D conversion result of the timings t1 to t4, in a signal block period TP1' corresponding to the data block period TP1. The soft decision circuit 52d obtains likelihood information (that is, log likelihood) of all symbol sequences of all mapping rules, with respect to a signal block according to an A/D conversion result of the timings t5 to t8, in a signal block period TP2' corresponding to the data block period TP2. The soft decision circuit 52d obtains likelihood information (that is, log likelihood) of all symbol sequences of all mapping rules, with respect to a signal block according to an A/D conversion result of the timings t9 to t12, in a signal block period TP3' corresponding to the data block period TP3.

The soft decision circuit 52d supplies the likelihood information (that is, the log likelihood) of all symbol sequences of all mapping rules to the operation circuit 52e and the estimation circuit 52f.

The operation circuit 52e holds the likelihood information of all symbol sequences of all mapping rules not only for the signal block of the processing target but also for previous and subsequent signal blocks. In order to increase the accuracy of the likelihood information of each symbol sequence of the signal block of the processing target, the operation circuit 52e generates combined likelihood information by utilizing the likelihood information of the previous and subsequent signal blocks. That is, the operation circuit 52e obtains the likelihood of the termination pattern of the previous signal block on the basis of the likelihood information of the previous signal block, and obtains the likelihood of the mapping rule used for the subsequent signal block on the basis of the likelihood information of the subsequent signal block. In addition, the operation circuit 52e obtains combined likelihood information (that is, combined log likelihood) of a signal block of the processing target in which the likelihood of the termination pattern of the previous signal block and the likelihood of the mapping rule used for the subsequent signal block are combined, for each symbol sequence of a plurality of mapping rules.

In the case of M=3 and n=4, the operation circuit 52e obtains combined log likelihood JM(Ra(t), Sa(t)) of the symbol sequence (that is, any symbol sequence in which the termination pattern is described as Sa in FIG. 3) in which the mapping rule is Ra and the termination pattern is Sa for the signal block of the processing target, by the formula 5. The operation circuit 52e obtains combined log likelihood JM(Ra(t), Sb(t)) of the symbol sequence (that is, any symbol sequence in which the termination pattern is described as Sb in FIG. 3) in which the mapping rule is Ra and the termination pattern is Sb for the signal block of the processing target, by the formula 6. The operation circuit 52e obtains combined log likelihood JM(Rb(t), Sa(t)) of the symbol sequence (that is, any symbol sequence in which the termination pattern is described as Sa in FIG. 4) in which the mapping rule is Rb and the termination pattern is Sa for the signal block of the processing target, by the formula 7. The operation circuit 52e obtains combined log likelihood JM(Rb(t), Sb(t)) of the symbol sequence (that is, any symbol sequence in which the termination pattern is described as Sb in FIG. 4) in which the mapping rule is Rb and the termination pattern is Sb for the signal block of the processing target, by the formula 8.

The operation circuit 52e supplies the combined likelihood information (that is, the combined log likelihood) of each symbol sequence of a plurality of mapping rules for the signal block of the processing target to the estimation circuit 52f.

The estimation circuit 52f estimates a mapping rule used for the signal block of the processing target, according to the combined likelihood information of each symbol sequence of the plurality of mapping rules. At this time, the estimation circuit 52f estimates a mapping rule for each bit label. That is, for each bit label, the estimation circuit 52f compares combined likelihood information of a plurality of mapping rules, adopts symbol sequence having the largest likelihood, and configures a mapping rule as an estimation result.

In the case of M=3 and n=4, in the combined likelihood information (that is, the combined log likelihood) of the symbol sequences of the two mapping rules Ra and Rb with respect to the same bit label, the estimation circuit 52f selects the symbol sequence having the large likelihood as the recorded symbol sequence. As a result, the mapping rule as the estimation result is configured.

The estimation circuit 52f supplies the mapping rule as the estimation result and the combined likelihood information of each symbol sequence to the NB-LDPC decoder 52g. The NB-LDPC decoder 52e performs LDPC decoding processing using the combined likelihood information of each symbol sequence and restores data. That is, the NB-LDPC decoder 52e specifies the symbol sequence having the largest likelihood among the combined likelihood information of each symbol sequence, specifies the bit label corresponding to the specified symbol sequence from the mapping rule as the estimation result, and restores the specified bit label as a data block.

Figure 8:
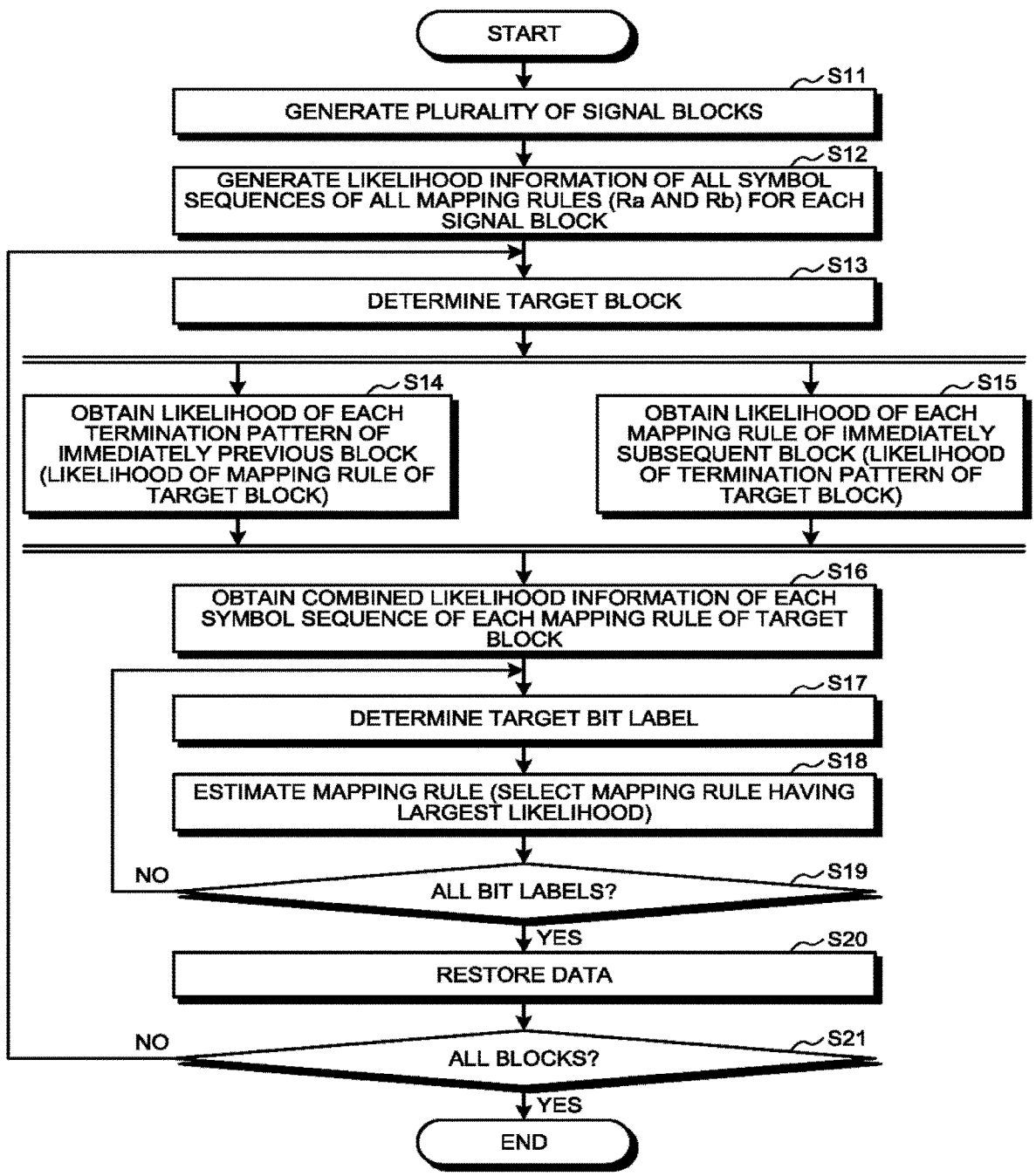
FIG. 8 is a flowchart illustrating readback processing in the embodiment.

Next, a flow of the readback processing in the storage device 1 will be described using FIG. 8. FIG. 8 is a flowchart illustrating the readback processing. FIG. 8 illustrates an example of a flow of the readback processing in the case of M=3 and n=4.

The storage device 1 performs predetermined processing on the signal read from the recording medium 11 and generates a plurality of signal blocks (S11). The storage device 1 generates likelihood information of all symbol sequences "−1, −1, −1, −1" to "0, 1, 1, 1" of all mapping rules Ra and Rb, for each signal block (S12). If the storage device 1 determines a signal block of a processing target among the plurality of signal blocks (S13), the storage device 1 performs obtaining likelihood information of each of the termination patterns Sa and Sb for a previous signal block (S14) and obtaining likelihood information of each of the mapping rules Ra and Rb for a subsequent signal block (S15) in parallel.

If both S14 and S15 are completed, the storage device 1 obtains combined likelihood information of each symbol sequence of each mapping rule for the signal block of the processing target, by the formulas 5 to 8 (S16). The storage device 1 determines a bit label of the processing target among the bit labels "00000" to "11111" of the mapping rules Ra and Rb (S17). The storage device 1 estimates a mapping rule for the bit label of the processing target (518). That is, the storage device 1 compares the combined likelihood information of the symbol sequence corresponding to the bit label of the processing target in the mapping rule Ra with the combined likelihood information of the symbol sequence corresponding to the bit label of the processing target in the mapping rule Rb, selects the mapping rule having the largest likelihood, and sets the mapping rule as the estimation result of the mapping rule for the bit label of the processing target. If a next bit label exists (No in S19), the storage device 1 returns the processing to S17, and if the next bit label does not exist (Yes in S19), the storage device 1 restores data using the estimation result obtained in S17 to S19 S20). That is, the storage device 1 performs the LDPC decoding processing using the combined likelihood information of each symbol sequence and restores the data. If a next signal block exists (Yes in S21), the storage device 1 returns the processing to S13, and if the next signal block does not exist (No in S21), the storage device 1 ends the processing.

As described above, in the present embodiment, in the storage device 1, a plurality of types of mapping rules in which bit labels are mapped to M-ary symbol sequences are prepared, and a mapping rule to be used for conversion into a subsequent M-ary symbol sequence is adaptively selected according to a termination pattern of an previous M-ary symbol sequence. As a result, it is possible to suppress shortening of the pulse width of the signal at the boundary between the symbol sequences in PWM-based multi-level recording, and it is possible to improve the recording density of the signal.

For example, a linear recording density can be improved by about 10% with respect to an information recording method of recording binary symbols on the recording medium 11. Further, in the case of M=3, a sequence satisfying the sequence pattern 2 can be generated even in a 4-symbol sequence. From this, it is possible to realize modulation of 5B4T (rate=5/4), which is a modulation rate higher than 6B5T (rate=6/5) to be a modulation rate limit at the block modulation.

It should be noted that, in the mapping rule Ra illustrated in FIG. 3 and the mapping rule Rb illustrated in FIG. 4, the similarity of the patterns of the symbol sequences increases between similar bit labels (for example, between vertically adjacent rows in FIGS. 3 and 4). This indicates that, since a distance between signal points existing in the same signal set is relatively short, the Euclidean distance in the equalization is likely to increase, and an improvement effect of the obtained recording density may be limited. Therefore, the following extension of modulation processing is considered.

The mapping rule Ra illustrated in FIG. 3 and the mapping rule Rb illustrated in FIG. 4 are alternately exchanged for each bit label to configure a mapping rule Ra' illustrated in FIG. 9 and a mapping rule Rb' illustrated in FIG. 10. That is, the symbol sequence corresponding to the odd-numbered bit label in FIG. 3 is replaced with the symbol sequence corresponding to the odd-numbered bit label in FIG. 4 to configure the mapping rule Ra' illustrated in FIG. 9. The symbol sequence corresponding to the odd-numbered bit label in FIG. 4 is replaced with the symbol sequence corresponding to the odd-numbered bit label FIG. 3 to configure the mapping rule Rb' illustrated in FIG. 10. FIG. 9 is a diagram illustrating one mapping rule Ra' in a modification of the embodiment. FIG. 10 is a diagram illustrating another mapping rule Rb' in the modification of the embodiment.

In the mapping rule Ra' illustrated in FIG. 9 and the mapping rule Rb' illustrated in FIG. 10, the similarity of the patterns of the symbol sequences decreases between similar bit labels (for example, between vertically adjacent rows in FIGS. 3 and 4), as compared with the mapping rule Ra illustrated in FIG. 3 and the mapping rule Rb illustrated in FIG. 4. As a result, since the distance between the signal points in the same modulation signal set can be maintained large, the Euclidean distance in the equalization can be decreased, and further improvement of the recording density of the signal can be expected.

At this time, according to that the mapping rule Ra illustrated in FIG. 3 and the mapping rule Rb illustrated in FIG. 4 are alternately exchanged for each bit label to configure the mapping rule Ra' illustrated in FIG. 9 and the mapping rule Rb' illustrated in FIG. 10, the recording processing in the storage device 1 is changed as follows so that the sequence pattern 2 is obtained.

For example, in S4, (the selection circuit 51c in) the storage device 1 refers to the start pattern of the symbol sequence corresponding to the bit pattern (bit label) of the data block of the processing target in each of the mapping rules Ra' and Rb' and selects the mapping rule in which the start pattern is Pa. In S5, (the selection circuit 51c in) the storage device 1 refers to the start pattern of the symbol sequence corresponding to the bit pattern (bit label) of the data block of the processing target in each of the mapping rules Ra' and Rb' and selects the mapping rule in which the start pattern is Pb. As a result, when the mapping rule Ra' illustrated in FIG. 9 and the mapping rule Rb' illustrated in FIG. 10 are used, a sequence satisfying the sequence pattern 2 can be generated.

Figure 11:
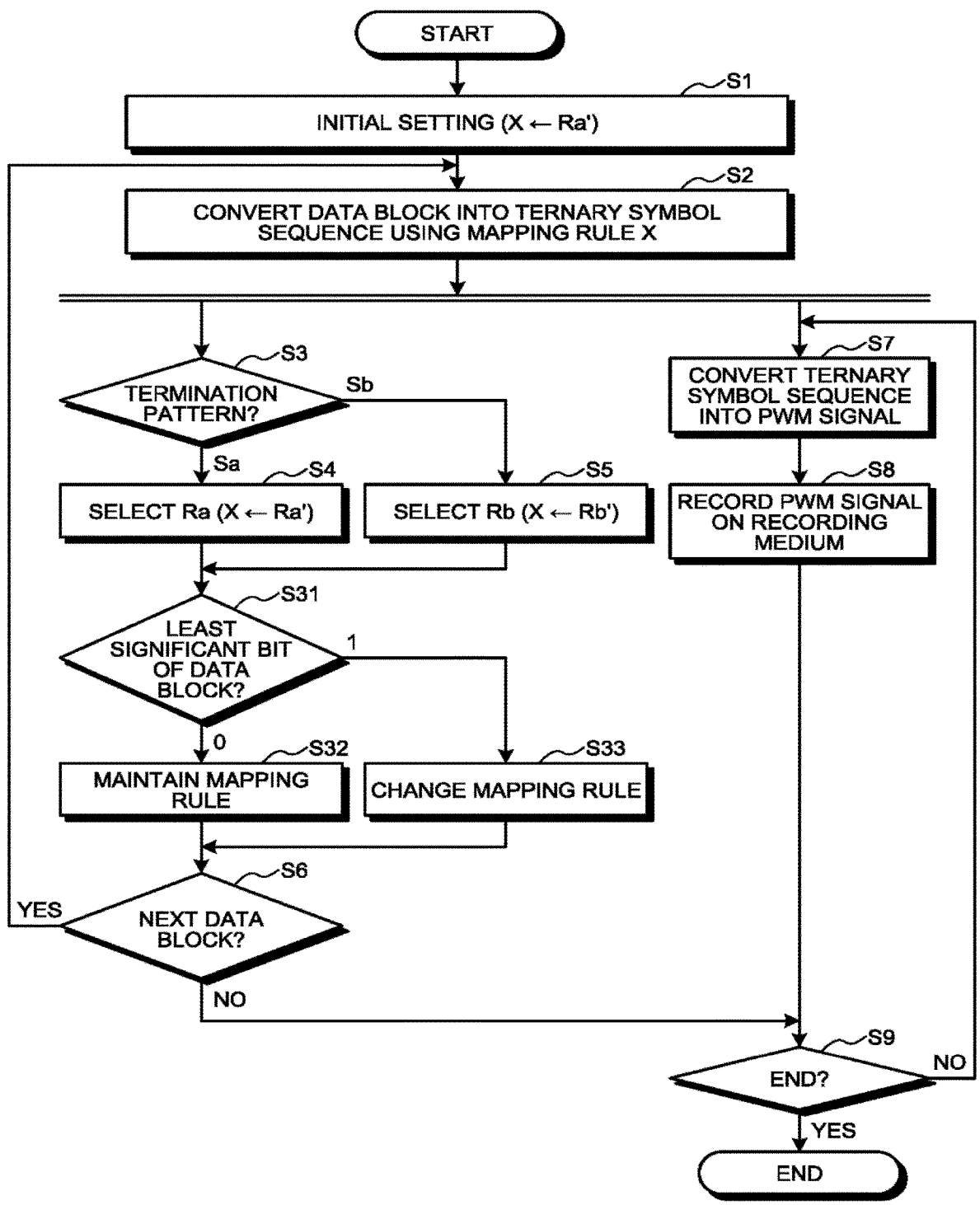
FIG. 11 is a flowchart illustrating recording processing in the modification of the embodiment.

Alternatively, the recording processing is changed as illustrated in FIG. 11. FIG. 11 is a flowchart illustrating recording processing in the modification of the embodiment.

That is, if S4 or S5 is completed, (the selection circuit 51c in) the storage device 1 confirms a bit value of a least significant bit (LSB) of the data block of the processing target (S31). If the bit value of the least significant bit of the data block of the processing target is "0", the storage device 1 maintains the mapping rule selected in S4 or S5 (S32). If the bit value of the least significant bit of the data block of the processing target is "1", the storage device 1 changes the mapping rule selected in S4 or S5 (S33). That is, if the mapping rule Ra' is selected, (the selection circuit 51c in) the storage device changes the mapping rule X to be used in the conversion of S2 to the mapping rule Rb', and if the mapping rule Rb' is selected, (the selection circuit 51c in) the storage device 1 changes the mapping rule X to be used in the conversion of S2 to the mapping rule Ra'. As a result, when the mapping rule Re' illustrated in FIG. 9 and the mapping rule Rb' illustrated in FIG. 10 are used, a sequence satisfying the sequence pattern 2 can be generated.

Further, according to that the mapping rule Ra illustrated in FIG. 3 and the mapping rule Rb illustrated in FIG. 4 are alternately exchanged for each bit label to configure the mapping rule Re' illustrated in FIG. 9 and the mapping rule Rb' illustrated in FIG. 10, the readback processing in the storage device 1 is changed as follows so that the equalization is appropriately performed.

For example, the recording process is performed using the mapping rule Re' illustrated in FIG. 9 and the mapping rule Rb' illustrated in FIG. 10 as illustrated in FIG. 11. However, the readback processing is performed using the mapping rule Ra illustrated in FIG. 3 and the mapping rule Rb illustrated in FIG. 4 as illustrated in FIG. 8. As a result, the readback signal can be appropriately equalized to a ternary symbol sequence.

Figure 12:
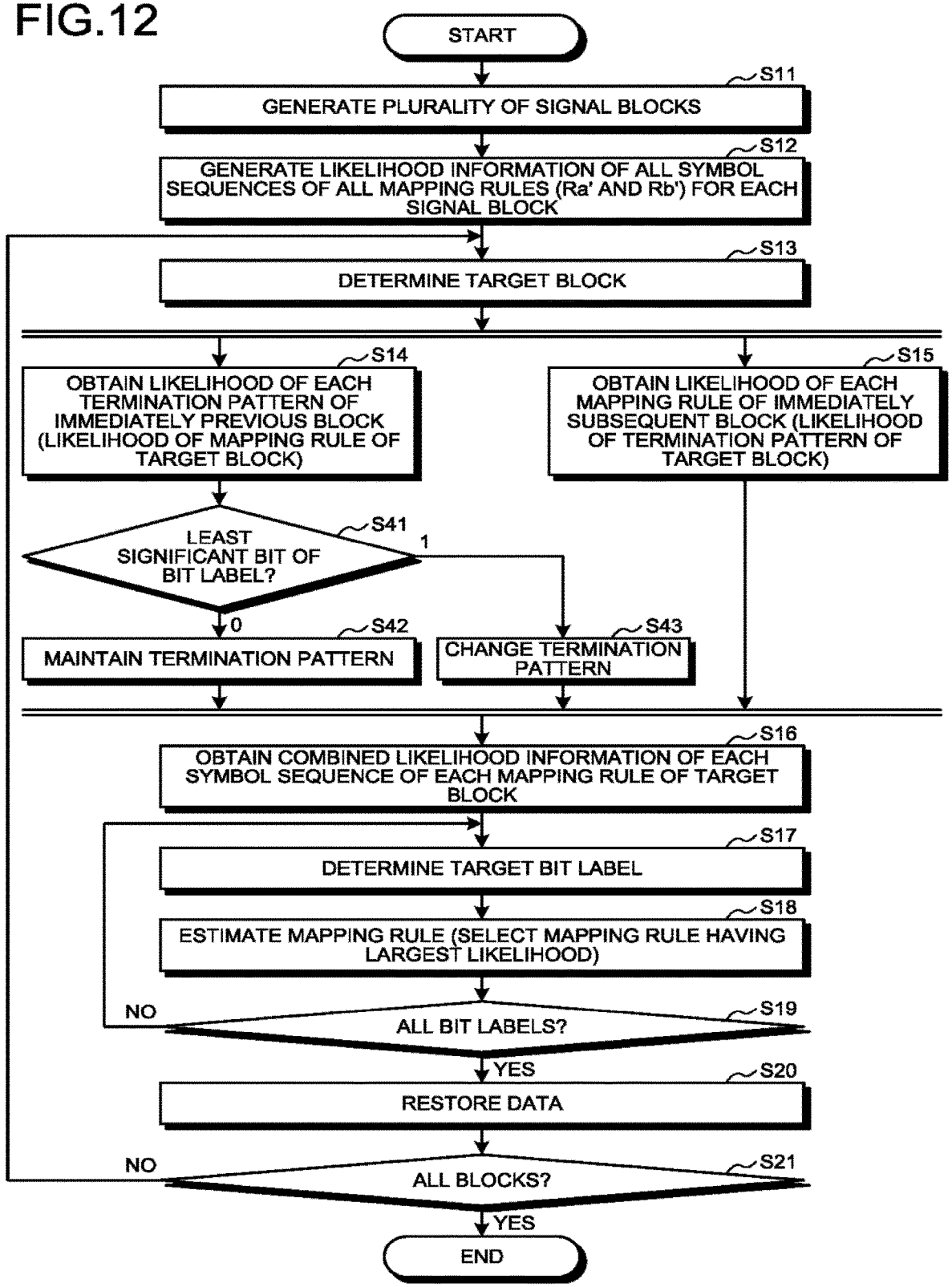
FIG. 12 is a flowchart illustrating readback processing in the modification of the embodiment.

Alternatively, the readback processing is changed as illustrated in FIG. 12. FIG. 12 is a flowchart illustrating readback processing in the modification of the embodiment.

That is, if S14 is completed, the storage device 1 confirms a bit value of a least significant bit (LSE) of the bit label corresponding to the termination pattern, for each termination pattern used in the operation of S14 (S41). If the bit value of the least significant bit of the bit label corresponding to the termination pattern is "0", the storage device 1 maintains the termination pattern used in S14 (S42) and maintains the operation result of S14. If the bit value of the least significant bit of the hit label corresponding to the termination pattern is "1", the storage device 1 changes the termination pattern used in S14 (S43). That is, if the storage device 1 uses the likelihood information (log likelihood) of the termination pattern Sa for the bit label, the storage device 1 removes (subtracts) the likelihood information of the termination pattern Sa from the operation result of S14 and adds the likelihood information of the termination pattern Sb. If the storage device 1 uses the likelihood information (log likelihood) of the termination pattern Sb for the bit label, the storage device 1 removes (subtracts) the likelihood information of the termination pattern Sb from the operation result of S14 and adds the likelihood information of the termination pattern Sa. As a result, the readback signal can be appropriately equalized to a ternary symbol sequence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a selection circuit that selects one mapping rule from a plurality of mapping rules in which each of bit labels having a bit length of (n+1) or more is mapped to n M-ary symbols, when M is defined as an integer of 3 or more and n is defined as an integer of 2 or more;
   a first conversion circuit that converts a data block in data into an M-ary symbol sequence using the selected one mapping rule;
   a second conversion circuit that converts the converted M-ary symbol sequence into an M-step pulse width signal;
   a recording medium that records converted M-step pulse width signal; and
   a readback circuit that equalizes the signal read from the recording medium to the M-ary symbol sequence and restores the data.

2. The storage device according to claim 1, wherein
   the data includes
   a first data block, and
   a second data block subsequent to the first data block,
   the first conversion circuit converts the first data block into a first symbol sequence, using the selected one mapping rule,
   the selection circuit selects one mapping rule to be used in the second data block from the plurality of mapping rules, according to a termination pattern of the first symbol sequence, and
   the first conversion circuit converts the second data block into a second symbol sequence, using one mapping rule selected according to the termination pattern of the first symbol sequence.

3. The storage device according to claim 2, further comprising:
   a buff circuit that holds the first symbol sequence converted by the first conversion circuit, wherein
   the selection circuit selects one mapping rule to be used in the second data block from the plurality of mapping rules, according to the termination pattern of the first symbol sequence held by the buffer circuit.

4. The storage device according to claim 2, wherein
   the plurality of mapping rules have a first mapping rule in which a bit label is mapped to a symbol sequence of a first start pattern and a second mapping rule in which a bit label is mapped to a symbol sequence of a second start pattern.

5. The storage device according to claim 1, wherein
   the data includes
   a first data block, and
   a second data block subsequent to the first data block,
   the first conversion circuit converts the first data block into a first symbol sequence, using the selected one mapping rule,
   the selection circuit selects one mapping rule to be used in the second data block from the plurality of mapping rules, according to a termination pattern of the first symbol sequence and a value of a least significant bit of the second data block, and
   the first conversion circuit converts the second data block into a second symbol sequence, using one mapping rule selected according to the termination pattern of the first symbol sequence and the value of the least significant bit of the second data block.

6. The storage device according to claim 5, further comprising:
   a buffer circuit that holds the first symbol sequence converted by the first conversion circuit, wherein
   the selection circuit selects one mapping rule to be used in the second data block from the plurality of mapping rules, according to the termination pattern of the first symbol sequence held by the buffer circuit and the value of the least significant bit of the second data block.

7. The storage device according to claim 5, wherein
   the plurality of mapping rules have
   a first mapping rule in which a first bit label is mapped to a symbol sequence of a first start pattern and a second bit label is mapped to a symbol sequence of a second start pattern, and a second mapping rule in which the first bit label is mapped to the symbol sequence of the second start pattern and the second bit label is mapped to the symbol sequence of the first start pattern.

8. The storage device according to claim 1, wherein
the signal read from the recording medium includes
a first signal block,
a second signal block subsequent to the first signal block, and
a third signal block subsequent to the second signal block, and
the readback circuit equalizes each of the first signal block, the second signal block, and the third signal block to each symbol sequence included in the plurality of mapping rules, estimates a mapping rule to be used in the second signal block, according to an equalization result of the first signal block and an equalization result of the third signal block, and restores data according to an equalization result of the second signal block, using the estimated mapping rule.

9. The storage device according to claim 8, wherein
the readback circuit has
a soft decision circuit that generates likelihood information of each symbol sequence of the plurality of mapping rules for each of the first signal block, the second signal block, and the third signal block,
an operation circuit that obtains likelihood of a termination pattern of the first signal block on the basis of the likelihood information of the first signal block, obtains likelihood of a mapping rule to be used in the third signal block on the basis of the likelihood information of the third signal block, and obtains combined likelihood information of the second signal block in which the likelihood of the termination pattern of the first signal block and the likelihood of the mapping rule to be used in the third signal block are combined, for each symbol sequence of the plurality of mapping rules,
an estimation circuit that estimates a mapping rule to be used in the second signal block, according to the combined likelihood information of each symbol sequence of the plurality of mapping rules, and
a restoration circuit that restores data according to the combined likelihood information, using the estimated mapping rule.

10. The storage device according to claim 9, wherein
the operation circuit temporarily obtains the likelihood of the termination pattern of the first signal block, maintains or changes the temporarily obtained likelihood according to a value of a least significant bit of a bit label corresponding to a termination pattern used for temporarily obtaining the likelihood, and obtains the likelihood of the termination pattern of the first signal block.

11. A storage method comprising:
selecting one mapping rule from a plurality of mapping rules in which each of bit labels having a bit length of (n+1) or more is mapped to n M-ary symbols, when M is defined as an integer of 3 or more and n is defined as an integer of 2 or more;
converting a data block in data into an M-ary symbol sequence using the selected one mapping rule;
converting the converted M-ary symbol sequence into an M-step pulse width signal;
recording the converted M-step pulse width signal on a recording medium; and
equalizing the signal read from the recording medium to the M-ary symbol sequence and restoring the data.

12. The storage method according to claim 11, wherein
the data includes
a first data block, and
a second data block subsequent to the first data block,
the converting into the M-ary symbol sequence includes
converting the first data block into a first symbol sequence, using the selected one mapping rule,
the selecting includes
selecting one mapping rule to be used in the second data block from the plurality of mapping rules, according to a termination pattern of the first symbol sequence, and
the converting into the M-ary symbol sequence further includes
converting the second data block into a second symbol sequence, using one mapping rule selected according to the termination pattern of the first symbol sequence.

13. The storage method according to claim 12, further comprising:
holding the converted first symbol sequence, wherein
the selecting includes
selecting one mapping rule to be used in the second data block from the plurality of mapping rules, according to the termination pattern of the held first symbol sequence.

14. The storage device according to claim 12, wherein
the plurality of mapping rules have
a first mapping rule in which a bit label is mapped to a symbol sequence of a first start pattern and
a second mapping rule in which a bit label is mapped to a symbol sequence of a second start pattern.

15. The storage method according to claim 11, wherein
the data includes
a first data block, and
a second data block subsequent to the first data block,
the converting into the M-ary symbol sequence includes
converting the first data block into a first symbol sequence, using the selected one mapping rule,
the selecting includes
selecting one mapping rule to be used in the second data block from the plurality of mapping rules, according to a termination pattern of the first symbol sequence and a value of a least significant bit of the second data block, and
the converting into the M-ary symbol sequence further includes
converting the second data block into a second symbol sequence, using one mapping rule selected according to the termination pattern of the first symbol sequence and the value of the least significant bit of the second data block.

16. The storage method according to claim 15, further comprising:
holding the converted first symbol sequence, wherein
the selecting includes
selecting one mapping rule to be used in the second data block from the plurality of mapping rules, according to the termination pattern of the held first symbol sequence and the value of the least significant bit of the second data block.

17. The storage device according to claim 15, wherein
the plurality of mapping rules have
a first mapping rule in which a first bit label is mapped to a symbol sequence of a first start pattern and a second bit label is mapped to a symbol sequence of a second start pattern, and
a second mapping rule in which the first bit label is mapped to the symbol sequence of the second start pattern and the second bit label is mapped to the symbol sequence of the first start pattern.

18. The storage method according to claim 11, wherein the signal read from the recording medium includes a first signal block, a second signal block subsequent to the first signal block, and a third signal block subsequent to the second signal block, and the restoring includes equalizing each of the first signal block, the second signal block, and the third signal block to each symbol sequence included in the plurality of mapping rules, estimating a mapping rule to be used in the second signal block, according to an equalization result of the first signal block and an equalization result of the third signal block, and restoring data according to an equalization result of the second signal block, using the estimated mapping rule.

19. The storage method according to claim 18, wherein the equalizing each of the first signal block, the second signal block, and the third signal block to each symbol sequence included in the plurality of mapping rules, estimating the mapping rule to be used in the second signal block, according to the equalization result of the first signal block and the equalization result of the third signal block, and restoring the data according to the equalization result of the second signal block, using the estimated mapping rule includes:

generating likelihood information of each symbol sequence of the plurality of mapping rules for each of the first signal block, the second signal block, and the third signal block;

obtaining likelihood of a termination pattern of the first signal block on the basis of the likelihood information of the first signal block, obtaining likelihood of a mapping rule to be used in the third signal block on the basis of the likelihood information of the third signal block, and obtaining combined likelihood information of the second signal block in which the likelihood of the termination pattern of the first signal block and the likelihood of the mapping rule to be used in the third signal block are combined, for each symbol sequence of the plurality of mapping rules;

estimating a mapping rule to be used in the second signal block, according to the combined likelihood information of each symbol sequence of the plurality of mapping rules; and restoring data according to the combined likelihood information, using the estimated mapping rule.

20. The storage method according to claim 19, wherein the obtaining the likelihood of the termination pattern of the first signal block includes:

temporarily obtaining the likelihood of the termination pattern of the first signal block; and maintaining or changing the temporarily obtained likelihood, according to a value of a least significant bit of a bit label corresponding to a termination pattern used for temporarily obtaining the likelihood, and obtaining the likelihood of the termination pattern of the first signal block.

* * * * *